US010921759B2

(12) United States Patent
Ma et al.

(10) Patent No.: US 10,921,759 B2
(45) Date of Patent: Feb. 16, 2021

(54) COMPUTER SYSTEM AND METHOD FOR MONITORING KEY PERFORMANCE INDICATORS (KPIS) ONLINE USING TIME SERIES PATTERN MODEL

(71) Applicant: Aspen Technology, Inc., Bedford, MA (US)

(72) Inventors: Jian Ma, Lexington, MA (US); Hong Zhao, Sugar Land, TX (US); Ashok Rao, Sugar Land, TX (US); Andrew L. Lui, Newton, MA (US); Willie K. C. Chan, Framingham, MA (US)

(73) Assignee: Aspen Technology, Inc., Bedford, MA (US)

( * ) Notice: Subject to any disclaimer, the term of this patent is extended or adjusted under 35 U.S.C. 154(b) by 31 days.

(21) Appl. No.: 16/307,620

(22) PCT Filed: Jul. 7, 2017

(86) PCT No.: PCT/US2017/041003
§ 371 (c)(1),
(2) Date: Dec. 6, 2018

(87) PCT Pub. No.: WO2018/009733
PCT Pub. Date: Jan. 11, 2018

(65) Prior Publication Data
US 2019/0227504 A1    Jul. 25, 2019

Related U.S. Application Data

(60) Provisional application No. 62/359,575, filed on Jul. 7, 2016.

(51) Int. Cl.
*G05B 13/04* (2006.01)
*G05B 23/02* (2006.01)

(52) U.S. Cl.
CPC ....... *G05B 13/042* (2013.01); *G05B 23/0227* (2013.01)

(58) Field of Classification Search
CPC . G05B 13/042; G05B 23/0227; G05B 23/024
See application file for complete search history.

(56) References Cited

U.S. PATENT DOCUMENTS 5,764,509 A * 6/1998 Gross ................. G05B 23/0254
700/29
6,564,119 B1 * 5/2003 Vaculik .................. B22D 11/16
164/151.5

(Continued)

FOREIGN PATENT DOCUMENTS

WO    2009023659 A1    2/2009
WO    2015053774 A1    4/2015

OTHER PUBLICATIONS

International Preliminary Report on Patentability for PCT/US2017/041003 entitled "Computer System and Method for Monitoring Key Performance Indicators (KPIs) Online Using Time Series Pattern Model", dated Jan. 8, 2019.

(Continued)

*Primary Examiner* — Christopher E. Everett
(74) *Attorney, Agent, or Firm* — Hamilton, Brook, Smith & Reynolds, P.C.

(57) ABSTRACT

Embodiments are directed to computer methods and systems that build and deploy a pattern model to detect an operating event in an online plant process. To build the pattern model, the methods and systems define a signature of the operating event, such that the defined signature contains a time series pattern for a KPI associated with the operating event. The methods and systems deploy the pattern model to automatically monitor, during online execution of the plant process, trends in movement of the KPI as a time series. The methods and systems determine, in real-time, a distance score (Continued)

between a range of the monitored time series and the time series pattern contained in the defined signature. The methods and systems automatically detect the operating event in the online industrial process based on the determined distance score, and alter parameters of the process (e.g., valves, actuators, etc.) to prevent the operating event.

23 Claims, 13 Drawing Sheets

(56) References Cited

U.S. PATENT DOCUMENTS

| | | | | |
|---|---|---|---|---|
| 2004/0088722 | A1* | 5/2004 | Peker | G06F 16/739 725/19 |
| 2004/0122859 | A1* | 6/2004 | Gavra | G06F 16/00 |
| 2004/0254762 | A1* | 12/2004 | Hopkins | C23C 16/52 702/182 |
| 2006/0129554 | A1 | 6/2006 | Suyama et al. | |
| 2006/0184264 | A1* | 8/2006 | Willis | G05B 19/4184 700/108 |
| 2007/0021859 | A1* | 1/2007 | Lev-Ami | G05B 23/0254 700/121 |
| 2008/0010531 | A1* | 1/2008 | Hendler | G05B 23/0281 714/33 |
| 2009/0149981 | A1* | 6/2009 | Evans | G05B 23/0254 700/110 |
| 2010/0057237 | A1* | 3/2010 | Kettaneh | G05B 19/41885 700/103 |
| 2010/0191361 | A1* | 7/2010 | McCready | G05B 13/048 700/104 |
| 2011/0035188 | A1* | 2/2011 | Martinez-Heras | G05B 23/021 702/189 |
| 2012/0271587 | A1* | 10/2012 | Shibuya | G05B 23/0229 702/127 |
| 2013/0318011 | A1* | 11/2013 | Jones | G06F 11/07 706/12 |
| 2016/0065604 | A1 | 3/2016 | Chen et al. | |
| 2016/0239756 | A1* | 8/2016 | Aggour | G05B 23/0229 |
| 2016/0320768 | A1 | 11/2016 | Zhao et al. | |
| 2017/0365155 | A1* | 12/2017 | Borutta | G05B 23/0254 |

OTHER PUBLICATIONS

International Search Report and Written Opinion for PCT/US2017/041003 entitled "Computer System and Method for Monitoring Key Performance Indicators (KPIs) Online Using Time Series Pattern Model", dated Oct. 6, 2017.

Keogh, E., et al., "Exact indexing of dynamic time warping," Knowledge and Information Systems (2004), DOI 10.1007/s10115-004-0154-9. May 13, 2004.

Guo, L., et al., "A Hybrid Process Monitoring and Fault Diagnosis Approach for Chemical Plants", International Journal of Chemical Engineering vol. 2015, Article ID 864782, Hindawi Publishing Corporation, pp. 1-9, Nov. 2015.

Dash S. et al. "Fuzzy-logic based trend classification for fault diagnosis of chemical processes", Computers and Chemical Engineering 27 (2003), pp. 347-362.

Chiang, L.H., et al., "Fault diagnosis in chemical processes using Fisher discriminant analysis, discriminant partial least squares, and principal component analysis", Chemometrics and Intelligent Laboratory Systems 50, 2000, pp. 243-252.

F. Westad, "Monitoring chemical processes for early fault detection using multivariate data analysis methods." http://www.camo.com/downloads/Monitoring_%20chemical_processes.pdf (2012).

Rakthanmanon, "Searching and Mining Trillions of Time Series Subsequences under Dynamic Time Warping," the 18th ACM SIGKDD Conference on Knowledge discovery and Data Mining, ACM, Aug. 12-16, 2012.

Goldin, D., et al., "On similarity queries for time-series data: Constraint specification and implementation," In: Montanari U., Rossi F. (eds), Principles and Practice of Constraint Programming CP (1995). Lecture Notes in Computer Science, vol 976. Springer, Berlin, Heidelberg.

Keogh, E., "Machine Learning in Time Series Databases (and Everything is a Time Series!)", Tutorial in AAAI 2011, Aug. 7, 2011.

Schmidt, G., "Grundlagen der Regelungstechnik Analyse und Entwurf linearer und einfacher nichtlinearer Regelungen sowie diskreter Steuerungen," Springer-Verlag, p. 276, (1991).

Communication pursuant to Article 94(3) EPC, Appl. No. 17742346.4, "Computer System and Method for Monitoring Key Performance Indicators (KPIs) Online Using Time Series Pattern Model," dated Dec. 16, 2019.

* cited by examiner

COMPUTER SYSTEM AND METHOD FOR MONITORING KEY PERFORMANCE INDICATORS (KPIS) ONLINE USING TIME SERIES PATTERN MODEL

RELATED APPLICATION

This application is the U.S. National Stage of International Application No. PCT/US2017/041003, filed Jul. 7, 2017, which designates the U.S., published in English, and claims the benefit of to U.S. application Ser. No. 62/359,575, filed Jul. 7, 2016. The entire teachings of the above applications are incorporated herein by reference in their entirety.

BACKGROUND

In the process industry, sustaining and maintaining process performance has become an important component in advanced process control and asset optimization of an industrial or chemical plant. The sustaining and maintaining of process performance may provide an extended period of efficient and safe operation and reduced maintenance costs at the plant. To sustain and maintain performance of a plant process, a set of Key Performance Indicators (KPIs) may be monitored to detect issues and inefficiencies in the plant process. In particular, monitoring trends in the movement (e.g., as a time series) of the KPIs provide insight into the plant process operation and indicate potential incoming undesirable events (e.g., faults) affecting performance of the plant process. However, traditional plant models are not suitable for such a task, e.g., monitoring time series of KPIs to detect and diagnose these undesirable operating events. The unsuitability of these traditional plant models is due, in part, to the nature of these undesirable events often occurring randomly when the plant process operates in an extreme condition that is out of coverage of the traditional plant model and having a varied root-cause at each random occurrence.

First, a traditional first-principle model is too complicated and expensive to develop for the detailed dynamic predictions required from monitoring KPI time series in an online plant process. Further, a first-principle model is typically calibrated with normal operational conditions, whereas the undesirable (extreme) events are often caused by extreme operational conditions not included in this model calibrated only by normal operational conditions. Second, building a traditional empirical model requires repeatable process event data to train and validate the model (e.g., correlation and regression models). However, undesirable event data is rare and the time series readings (e.g., amplitude, shape, and such) of a KPI from the same plant process producing the same product also often vary over time. Thus, repeatable process event data for a time series of a KPI is unavailable to sufficiently train and validate the empirical model. Third, a statistical model (univariate or multivariate) is only capable of detecting anomalous versus normal condition (e.g., indicate an anomaly occurred), but has limited capabilities in KPI time series monitoring and fault identification (e.g., reporting what occurred). Further, the results presented from a statistical model require expertise knowledge in statistics to understand and explain, and, thus, is often not intuitive to plant operators and other plant personnel.

Moreover, traditional multivariate statistical approaches for time series may use techniques, such as Principal Component Analysis (PCA) and Partial Least Squares Regression (PLSR), nonlinear neural network, and the like, in implementing monitoring and detecting undesirable operating events (faults). These traditional multivariate statistical approaches require periodic recalibrating and retraining to prevent the model from classifying a new normal operating state as an outlier (and issue false alerts). Further, Fuzzy-reasoning approaches, which have also been employed for fault detection, require a complicated event signature reasoning system for KPI trend processing. The complicated event signature reasoning requires disassembling time series patterns into primitives, rebuilding the primitives, applying the similarity matrix, and such.

Recently, machine learning in time series and shape data mining approaches (techniques) are advancing rapidly (e.g., Thanawin Rakthanmanon et. al. "*Searching and Mining Trillions of Time Series Subsequences under Dynamic Time Warping*," the 18th ACM SIGKDD Conference on Knowledge discovery and Data Mining, Aug. 12-16, 2012). Such typical analysis techniques and their applications include Novelty detection, Motif discovery, Clustering, Classification, Indexing and Visualizing Massive Datasets, and the like. These new techniques have been applied to image recognition, medical data analysis, symbolic aggregate approximation, visual comparison in DNA species, and such. In the process industry, however, there are no known suitable techniques applied and successful applications reported for time series and shape data mining. There are several difficulties in applying new techniques, as mentioned above, in process industry. First, general time series data analysis algorithms alone are not suitable to process applications without problem-specific system and methods, such as data collection and preparation, pattern model development and management, and the like. Second, for plant operator and engineers, the model and results need to be consistent with their domain knowledge, in many cases, the system should be able to accept their domain knowledge into the modeling process, e.g., allow a user to be involved in the modeling and monitoring process. Third, the system and methods must allow users to develop one or more models and to run them in an online environment in daily (e.g., 24/7) non-stop operations. All the arts references mentioned above are unable to meet these requirements for the process industry.

SUMMARY OF THE INVENTION

Embodiments of the present invention are directed to a modeling approach suitable for detecting and predicting an operating event in an online plant process. These embodiments do not require the building of a complicated first-principle, empirical, or statistical model, or the costly preparation of data sets for training/validating these models. Rather, these embodiments build event pattern models that include a set of event signatures of a time series for a KPI associated with the operating event. Each event signature contains a whole time series pattern for the KPI that indicates the operating event in the plant process. The embodiment may configure the event signatures for the KPI that contain time series patterns of varying amplitude, offset, spread, shape, time range, and such.

These embodiments enable process operators, engineers, and system to define an event signature of an event pattern model in several ways, e.g., (i) use a known time series event-pattern from past events; (ii) use a signature pattern taken from a sister operation unit or plant; (iii) import a time series pattern from other resources; and (iv) select a pattern from an event signature library. In the case where no signature pattern is available or available signature patterns do not meet the user's criteria, the user may search for events patterns in the plant historian by using either: (i) an unsupervised (unguided) pattern discovery, (ii) supervised (guided) pattern discovery, and (iii) combined iterative pattern discovery. The embodiments further enable the user to construct a library of the built event pattern models.

As described above, the search and location of event patterns for event pattern models can be performed according to users' specifications on pattern characteristics of a time series or in an automated way by using a pattern discovery approach. In an unsupervised (e.g., "data-only") pattern discovery approach, the embodiments apply a pattern discovery algorithm to a given-length (finite) of time series for a KPI (e.g., KPI measurements) and locate clusters that have similarities at a given length in a time widow of the time series. In a supervised (user-guided) pattern discovery approach, the embodiments further combine user selected primitive shapes with the pattern discovery algorithm to speed up the pattern search process, reduce the number of non-event patterns, and result in the most meaningful pattern models for online deployment. The supervised (user-guided) pattern discovery algorithm enables a user to apply a default primitive shape library (e.g., bell-shape peak, rising, sinking, and the like), or dynamically (on the fly) draw a shape on an ad hoc drawing pane, or such. The supervised (user-guided) pattern discovery approach can influence what pattern characteristics are desired to be included or excluded in pattern clusters during the pattern discovery process. The supervised pattern discovery approach reduces time taken to build desired pattern clusters by trimming off/skipping unwanted pattern clusters before building pattern clusters.

In an online environment, these embodiments further monitor trends in movement (time series) of a KPI that are associated with an operating event during execution of the online plant process using the library of built event pattern models. The embodiments deploy one or more pattern models from the library, in iterations, to the online execution of the plant process. In deploying an iteration of a pattern model, these embodiments apply the corresponding set of event signatures to the trends in KPI movement (time series) in the online plant process. For each applied event signature, the embodiments compare the KPI time series pattern contained in the event signature, as a whole, to a range of the online KPI time series to determine similarity. The embodiments account for variations in amplitude, offset, shape, and time in determining the similarity between the online KPI time series range and time series pattern model. The embodiments calculate a distance (similarity) score based on the comparison, which quantifies the likelihood that the online KPI time series indicates the occurrence of the operating event in the online plant process. To do so, some embodiments provide a new distance criterion called Aspen Tech Distance (ATD) that measures similarities of a given length of a time series against a pattern library model. The ATD has similar mathematical properties to the conventional Euclidian Distance (ED), but it has several advantages over ED for process industrial applications.

The pattern models of these embodiments are formulated such that they can be used in monitoring the varied, daily operations of a subject plant. The pattern models may also be used in monitoring a related (sister) plant with similar operations under a similar or different scale. Further, the pattern models are formulated to be adaptable to changing operation conditions by simply replacing the event signatures as the process operation of the subject plant is changed, such as changed to produce a different product. The pattern models are also formulated such that they apply time series patterns as a whole, rather than applying disassembled time series primitives using a similarity matrix. The pattern models are further formulated such that they are independent of the data sampling rates used to measure the KPI time series pattern of an event signature and the KPI time series of an online plant process. The pattern models also enable the embodiments to present results that are intuitive to plant operators and other plant personnel, such as graphics and the distance score in an understandable full range (e.g., values between 0-1).

Example embodiments of the present invention are directed to computer-implemented methods, computer systems, and computer program products that detect an operating event in an industrial process. The operating event may be an undesirable or abnormal operating event occurring in the industrial process. The computer systems comprise a processor and a memory with computer code instructions stored thereon. The memory is operatively coupled to the processor such that, when executed by the processor, the computer code instructions cause the computer system to implement a modeler engine and an analysis engine. The computer program products comprises a non-transitory computer-readable storage medium having code instructions stored thereon. The storage medium is operatively coupled to a processor, such that, when executed by the processor, the computer code instructions cause the processor to detect an operating event in an industrial process.

In example embodiments, the computer methods, systems, and program products comprise at least a data server, a historian database, a web user interface (UI) and an application server. The embodiments reside in an application server, which may load plant historical data via the data server from a historian database, the historical data may include data collected from sensors by the Instrumentation or calculated KPIs. The embodiments may also interact with users through the web UI, e.g., accept users' specifications about a pattern signature or selection of an existing pattern model, etc. Then the embodiments may execute tasks such as pattern discovery, pattern model building, and online KPI time series monitoring etc. in the application server and send the results to Web UI for display.

The computer methods, systems (via the modeler engine), and program products define a signature of an operating event in an industrial process. The computer methods, systems, and program products define the signature to contain a time series pattern for a KPI associated with the operating event. In some embodiments, the computer methods, systems, and program products define the signature by loading historical plant data from computer memory (e.g., plant historian database via a data server). The computer methods, systems, and program products identify time series patterns of the KPI in the loaded historical plant data that are associated with the operating event. The computer methods, systems, and program products identify the time series patterns in the loaded historical plant data by at least one of: automatic pattern search and identification methods, application of operation logs, and review by a domain expert. The computer methods, systems, and program products then select a time series range for the signature and configure the signature to contain an identified time series pattern that corresponds to the time series range.

In some embodiments, the automatic pattern search and identification methods include a supervised pattern discovery method. In these embodiments, the computer methods, systems, and program products execute the supervised pattern discovery method. The supervised pattern discovery method defines one or more pattern shapes representing pattern characteristics of an abnormal operating condition.

The defined pattern shapes being stored in a shape library. The supervised pattern discovery method selects a pattern shape from the shape library for the operating event. As part of the selecting, the supervised pattern discovery method indicates inclusion or exclusion of the selected pattern shape when identifying time series patterns. The supervised pattern discovery method determines a distance profile between (i) the selected pattern shape and (ii) a time series of the KPI from the loaded historical plant data, and generates a search profile based on the determined distance profile. The supervised pattern discovery method, using the generated search profile, determines one or more pattern clusters that contain the identified time series patterns associated with the operating event.

The computer methods, systems (via the analysis engine), and program products then monitor, during online execution of the industrial process, trends in movement of the KPI as a time series of the KPI. Based on the monitoring, the computer methods, systems, and program products determine, in real-time, a distance score between (i) a range of the monitored time series of the KPI and (ii) the time series pattern for the KPI contained in the defined signature.

In some embodiments, the computer methods, systems, and program products calculate the distance score in real-time for the KPI by performing Z-normalization on both the monitored time series range and the time series pattern. The computer methods, systems, and program products then calculate an ATD distance between the Z-normalized monitored time series range and the Z-normalized time series pattern by allowing some degree of dynamic time warping (DTW). The computer methods, systems, and program products also calculate a zero-line Euclidean distance between a vector of zeros (i.e., zero-line) and the Z-normalized time series pattern. The computer methods, systems, and program products determine the distance score based on the calculated Euclidean distance with DTW and the calculated zero-line ATD distance. The determined distance score indicates the probability that the monitored time series range matches the time series pattern.

In some embodiments, the computer methods, systems, and program products also apply filters to eliminate certain variations between the monitored time series range and the time series pattern when determining the distance score. In example embodiments, the determined distance score is re-scaled to a value between 0 and 1, such that 1 indicates a highest probability of occurrence of the operating event and 0 indicates a lowest probability of occurrence of the operating event.

The computer methods, systems (via analysis engine), and program products detect the operating event associated with the defined signature in the executed industrial process based on the calculated distance score. The computer methods, systems, and program products, in response to detecting the operating event, may send event-alerts to operations that advise the operators to adjust parameters of the industrial process to prevent an undesirable operating event. In some embodiments, the computer methods, systems, and program products transmit the information related to the detected operating event to a process control system, which may adjust the parameters of the industrial process automatically to prevent such undesirable operating event in an automated manner (e.g., free of human intervention).

In some embodiments, the computer methods, systems, and program products perform the defining, monitoring, calculating, and detecting operation-events for multiple signatures for a KPI in parallel. In some of these embodiments, the time series patterns contained in the multiple defined signatures vary according to at least one of: amplitude, offset, shape, and time. The computer methods, systems, and program products then combine the distance score calculated for each of the multiple defined signatures of the KPI into a combined distance score. In these embodiments, the computer methods, systems, and program products detect the operating event based on the combined distance score for the KPI. In some of these embodiments, the computer methods, systems, and program products configure a signature library for storing the multiple defined signatures for future online monitoring.

In some embodiments, the computer methods, systems, and program products further perform the defining, monitoring, calculating, and detecting operations for multiple KPIs in parallel. The computer methods, systems, and program products define a set of weight coefficients corresponding to each of the multiple KPIs and weight the distance score calculated for a respective KPI based on the corresponding weight coefficient. The computer methods, systems, and program products combine the weighted distance score for each of the multiple KPIs into a total distance score. In these embodiments, the computer methods, systems, and program products detect the operating event based on the total distance score. In the foregoing ways, embodiments provide computer-based automated improvements to process monitoring technology and sustained process performance.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
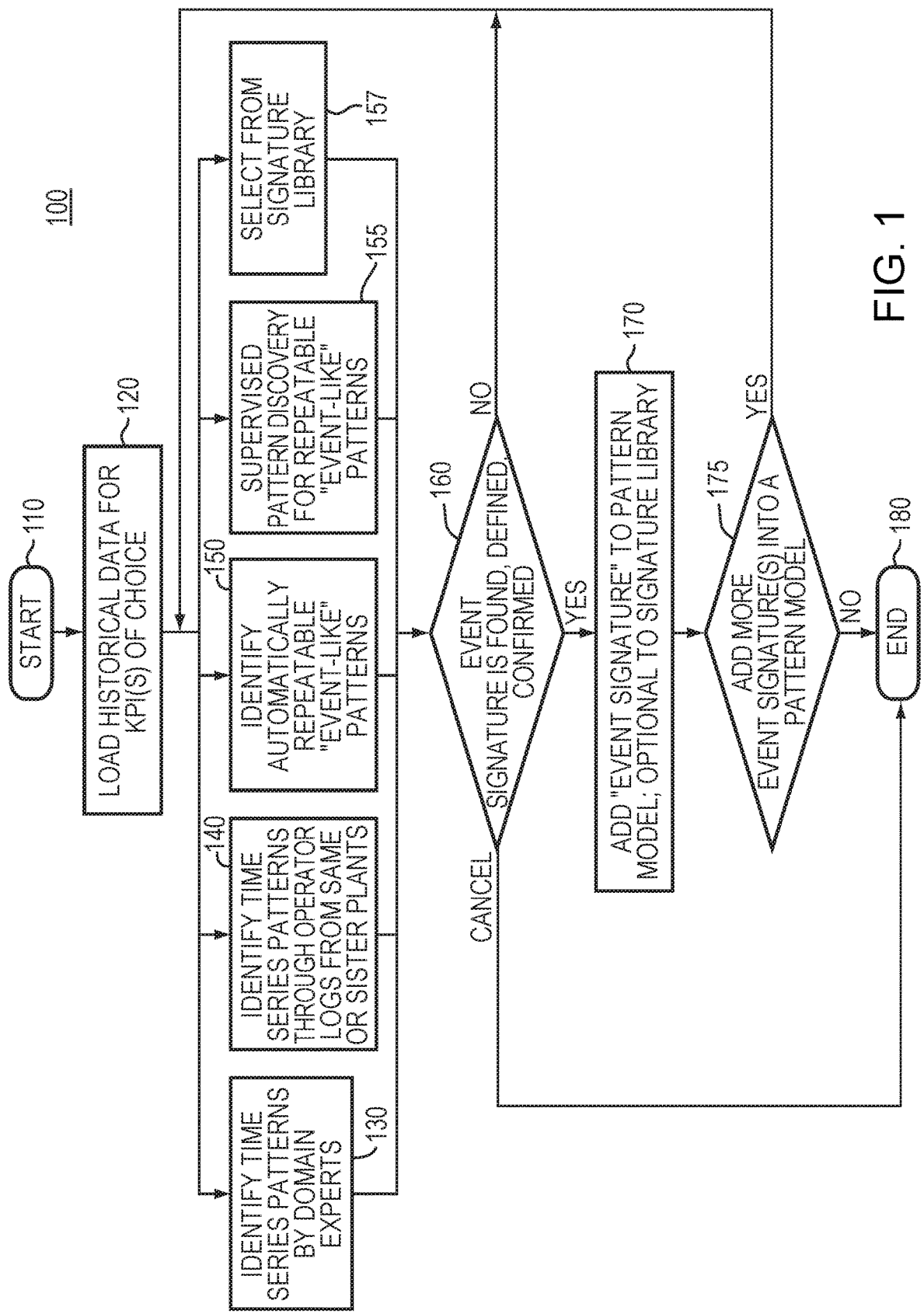
FIG. 1 is a flow diagram depicting an example method of building a pattern model in embodiments of the present invention.

A description of example embodiments of the invention follows.

Overview

Embodiments of the present invention provide a modeling approach (tools) for sustaining and maintaining performance of a plant process. Random abnormal (or otherwise undesirable) operating events, based on various root-causes, occur in an online plant process, which adversely affect the performance of the online plant process. These embodiments build and deploy a pattern model used to monitor trends in the movement (time series) of KPIs to detect a certain undesirable operating event in an online plant process. The deployed pattern models enable plant personnel (e.g., plant operators, maintenance personnel, and such) and plant operating systems to quickly locate, identify, monitor, and detect/predict the undesirable operating events (or any other plant event without limitation) and then take actions to prevent such undesirable events happing.

Previous modeling approaches are not suitable for monitoring and detecting trends in the movement (time series) of KPIs associated with an undesirable operating event in an online plant process. First, a traditional first-principle model is too complicated and expensive to develop and calibrate for the detailed dynamic predictions required to monitor readings of KPI time series in an online plant process. Further, a first-principle model is typically calibrated with normal operational conditions, whereas the undesirable events are often caused by extreme operational conditions not included in a model calibrated only by normal operational conditions.

Second, a traditional empirical model requires repeatable process event data to train and validate the model. However, the time series readings (e.g., amplitude, shape, and such) of a KPI from the same subject plant, producing the same product, may vary over time. The variance may be due to the subject plant operating, for producing the same product, at varying scales during different times based on regional/global market demand and supply. For example, Plant A may produce Ethylene at 100 ton/hour in January, and produce Ethylene at 150 ton/hour in February. Further, other (sister) plants producing similar products often operate at a completely different process scale from the subject plant all the time. For example, Plant B (subject plant) may produce Ethylene at 30 ton/hour, while plant C (sister plant) produces Ethylene at 100 ton/hour. As, the time series for KPIs may differ significantly between time periods and plants, repeatable process event data for a time series of a KPI is likely unavailable to sufficiently train and validate an empirical model.

Third, a statistical model (univariate or multivariate) has limited capabilities in KPI monitoring and event (fault) detection. In statistical models, preparing good training data sets and validation data sets is time consuming, but crucial for its success. Statistics models require frequent recalibration, as the operation conditions outside the statistic norms might be treated as outliers and trigger false alarms. For example, without recalibration, a new normal operating condition of a plant process may be incorrectly classified as an outlier, resulting in false event (fault) detection in the plant process. Further, statistical models built from a subject plant (plant A) are not likely very helpful to a sister plant (plant B), unless products/operation conditions at the two plants are nearly identical. Moreover, statistical models are complicated and costly to build and deploy in an online process, and only function well within the training/validation conditions of the plant for which they are built. In addition, the results presented from a statistical model require expertise knowledge in statistics to understand and explain, and, thus, is often not intuitive to plant operators and other plant personnel.

Recently, machine learning in time series and shape data mining techniques are advancing rapidly (see, e.g., Thanawin Rakthanmanon et. al. "*Searching and Mining Trillions of Time Series Subsequences under Dynamic Time Warping*," the 18$^{th}$ ACM SIGKDD Conference on Knowledge discovery and Data Mining, Aug. 12-16, 2012; Eamonn Keogh, "*Machine Learning in Time Series Databases* (*and Everything Is a Time Series*!)," Tutorial in AAAI 2011, 7th Aug. 2011.), herein incorporated by reference in its entirety, which describes typical new analysis techniques that include Dynamic Time Warping (DTW), Euclidean Distance (ED) in Novelty detection, Motif discovery, Clustering, Classification, Indexing and Visualizing Massive Datasets, and such. These new analysis techniques and their applications have been applied to images recognition, medical data analysis, symbolic aggregate approximation, and visual comparison in DNA species, and such. In process industry, however, there are neither known suitable techniques applied and nor successful applications reported for time series and shape data mining. There are several difficulties in applying new techniques, as mentioned above, in the process industry. First, general time series data analysis algorithms alone are not suitable to process applications without problem-specific systems and methods, such as data collection and preparation, pattern model development and management, and the like. Second, these analysis algorithms do not provide models and results that are consistent with domain knowledge of plant operator and engineers, and do not enable for plant operator and engineers to apply their domain knowledge into the modeling process. Third, these analysis algorithms do not enable users to develop one or more models and to run them in an online environment in daily (e.g., 24/7) non-stop operations, as required in the process industry. All the art references mentioned above are unable to meet these requirements.

In contrast to these traditional models and time series analysis approaches, the pattern model of embodiments of the present invention is less complicated to build, does not require the costly preparation of training and validation data, and is specifically suited to monitor trends in movement of KPIs. Embodiments can build the pattern model by defining a set of event signatures for each KPI of an operating event, where each event signature set contains time series patterns of the KPI associated with the operating event. The KPI time series patterns of a KPI may be identified from historical plant data by a domain expert, by comparison to operator logs, or by a pattern search and discovery technique. The embodiment may configure each event signature to contain time series patterns of the KPI having certain amplitude, offset, shape, time range, and such. During execution of the online process, the embodiments match the time series patterns of the KPI (contained in the event signatures) to the online trends in movement (time series) of the KPI to generate a distance (similarity) score. The distance score presents to plant personnel or plant operating system, and the likelihood that the trends in movement of the KPI indicate a potential operating event.

The pattern models are formulated such that they can be used in monitoring the varied, daily operation of a subject plant, and in monitoring a related (sister) plant with similar design operates under similar or different scale. For example, when the process operation of the plant is changed, such as changed to produce different products, the pattern models may be adapted to the current operation conditions by simply replacing the event signatures. The distance scores are calculated such that they are independent of the data sampling rates used to measure the KPI time series patterns of the event signatures and the KPI time series of an online plant process. The pattern models also enable the embodiments to present results that are intuitive to plant operators and other plant personnel, such as the distance (similarity) score in an understandable full range (e.g., values between 0-1).

In general, pattern recognition is a specific technique that has been applied in voice, image, and time-series recognitions in web, medical, smart phones, and the like. In contrast to example embodiments of the present invention, the process industry has been focused on multivariate statistical approaches for time series, such as Principal Component Analysis (PCA) and Partial Least Squares Regression (PLSR) model, nonlinear neural network, and the like, in implementing monitoring and fault diagnosis technology. See, e.g., "A hybrid process monitoring and fault diagnosis approach for chemical plants" by Guo et al.; "Fuzzy-logic based trend classification for fault diagnosis of chemical processes" by Dash et al.; "Fault diagnosis in chemical processes using Fisher discriminant analysis, discriminant partial least squares, and principal component analysis" by Chiang et al.; and "Monitoring chemical processes for early fault detection using multivariate data analysis methods" by Westad. For example, Fuzzy-reasoning approaches with time series pattern were attempted for fault diagnosis of chemical processes. See, e.g., "Fuzzy-logic based trend classification for fault diagnosis of chemical processes" by Dash et al.

In Fuzzy-reasoning approaches, a typical event signature reasoning system has three major components: trends' representation, trend identification technique, and technique for mapping trends to operational conditions. Further, the reasoning system extracts trend primitives using interval-halving, and defines a primitive similarity matrix to quantify the similarity between the trend primitives. The reasoning system then describes a trend pattern as a series of trend primitives, i.e. a string of characters. To prototyped events for given KPIs, the reasoning system builds a library to include the trend primitives and similarity matrix. The reasoning system computes similarity between a trend representing an unknown pattern and a string describing a prototype pattern to recognize, if the unknown pattern is one of the prototyped patterns. The reasoning system uses an IF-THEN rule library to relate trends to process state.

In contrast, embodiments of the present invention do not require the complicated event signature system of the reasoning system, which require three components for trend representation, identification, and mapping. Rather, the embodiments include less complicated defining and matching of event signatures that contain whole time series patterns of a KPI associated with an operational condition. The embodiments may determine similarities between a KPI time series and a whole KPI time series pattern without disassembling the KPI time series pattern into primitives, rebuilding the primitives, applying the similarity matrix, and such. Further, unlike in the reasoning system built, the embodiments may apply the same whole KPI time series patterns to detect an operation condition over variations in the same plant or in other similar plants.

Method of Building Pattern Model

FIG. 1 depicts an example computer-based method 100 of building a pattern model in embodiments of the present invention. The method 100 includes various workflows (steps) to build the pattern model. The example method 100 enables process operators, engineers, and systems to define an event signature of a time series (to build an event pattern model) in several ways. Some of these ways include: (i) use a known time series event-pattern from past events; (ii) use a signature pattern taken from a sister operation unit or plant; (iii) import a time series pattern from other resources; and (iv) select a pattern from an event signature library. In the case where no signature pattern is available or available signature patterns do not meet the user's criteria, the user may search events patterns in the plant historian by using either: (i) an unsupervised (unguided) pattern discovery; (ii) supervised (guided) pattern discovery; or (iii) combined iterative pattern discovery. The method 100 further enabled the user to build a library of the located event patterns (signature patterns).

The method 100 begins at step 110, by enabling a human or system user to select one or more key performance indicator (KPI) of an industrial or chemical process at a subject plant (e.g. a refinery or Ethylene plant). Method 100 (step 110) enables the user to select one or more KPI from the available process variables for the plant process. In some embodiments, step 110 may provide a user interface for the user to select the one or more KPI from the available process variables for the plant process. The user selects one or more KPI as an indicator of an undesirable (or abnormal) operating event related to the plant process, such as column flooding, heat exchanger fouling, compressor failure, pump shut-down, and the like, that is of interest to the user. For example, the user may select a flooding risk factor variable (e.g., column pressure difference between top and bottom of a column) as the KPI of a distillation column flooding event of interest related to the plant process. The movement (time series) of the one or more KPI may indicate that the operating event of interest is currently occurring in the plant process or is predicted to occur at a future time in the plant process.

The method 100, at step 120, then automatically loads historical data for the plant process from a plant historian database for the selected one or more KPI (KPI(s) of choice). The loaded historical data includes data specific to the selected KPI. The historical data may include one process variable measurement of the one or more KPI or may be an index of one or more process variable measurements of the KPI calculated using a process formula or model. The method 100, steps 130-157, identifies primary time series patterns for the one or more KPI (KPI time series patterns) of the operating event of interest, or a similar operating event, in the historical data. The method 100 may perform one or more of steps 130-157 to identify such KPI time series patterns. The method 100 may enable process operators, engineers, and systems to search KPI time series patterns in the plant historian and build the pattern model from the KPI time series patterns located by the search (i.e., define event signature patterns on time series in the plant historian data). The method 100 (steps 130-157) can perform the search and location of KPI time series patterns according to users' specifications on pattern characteristics or in an automated way, such as by using a pattern discovery approach. The KPI time series patterns identified by steps 130-157 may be of varying duration (length or range), amplitude, offset, shape, time, and such.

At step 130, the method 100 enables a domain expert to analyze the historical data and identify (predefine) KPI time series patterns related to the operating event of interest. For example, step 130 may provide a user interface that enables the user (e.g., domain expert) to review the historical data as a time series (e.g., in a graph or other such format) and identify KPI time series patterns related to the operating event of interest in the historical data. The historical data may include a known time series event-pattern from past occurrences of the operating event of interest. At step 140, the method 100 automates identification of KPI time series patterns based on operator logs from the subject plant, another (sister) plant or operation unit, or another plant resource having similar structure, feed stocks, processing capacity, and the like. The operating logs include undesirable event records and associations with the selected KPI over a certain time period, which was recorded by a plant operator during the operating event of interest (or similar or related operating event). In some embodiments, the user selects a signature pattern from the operating logs of subject plant, sister plant or operation unit, or other plant resource. In other embodiments, Step 140 compares the historical data according to operator logs to automatically identify time series patterns for the KPI during the operating event of interest.

At step 150, method 100 automatically performs a pattern search and identification technique on the historical data of the KPI. In some example embodiments, the method 100 (step 150) may automatically perform a pattern search and identification technique on KPI data from the plant process during online execution at the subject plant. The pattern search and identification technique of step 150 is an unsupervised pattern discovery technique (e.g., Motif pattern search and discovery technique). This technique applies a pattern discovery algorithm to a KPI time series (e.g., KPI measurements taken from the plant historian) of a given-length (finite) time window, and searches/locates pattern clusters that have similarities to the operating event of interest in the time window. That is, the pattern discovery algorithm traverses through the time window and builds pattern clusters that contain repeatable KPI time series patterns ("event-like" patterns). The identified clusters may include a cluster of patterns that are close in characteristics to the operating event of interest.

At step 155, method 100 automatically performs a supervised (guided) pattern discovery. The supervised pattern discovery technique enables the user to select primitive shapes, as part of the pattern discovery algorithm of step 150, to speed up the pattern cluster search process, reduce the number of non-event pattern clusters located by the algorithm, and result in the most meaningful pattern models for online deployment. In the supervised pattern discovery, as the pattern discovery algorithm traverses through the time window to build the pattern clusters, the technique identifies candidates from the repeated KPI time series patterns. The supervised technique applies primitive shapes selected by the user from a default primitive shape library (e.g., bell-shape peak, rising, sinking, and the like), or dynamically drawn (on the fly) by the user on an ad hoc drawing pane, to the identified KPI time series pattern candidates to identify patterns with most characteristics of the operating event of interest. The supervised technique builds and returns pattern clusters containing those patterns identified as most characteristic of the operating event of interest. The application of the primitive shapes to the pattern candidates reduces the time taken to build desired pattern clusters by trimming off/skipping unwanted pattern clusters before building pattern clusters.

At steps 150 and 155, the method 100 may further interact with a user (e.g., plant operator or other plant personnel) to confirm that the identified KPI time series patterns and/or pattern clusters relate to the operating event of interest. For example, steps 150 and 155 may provide a user interface that presents each identified KPI time series pattern or pattern cluster to the user and enables the user to confirm the pattern/cluster as a KPI time series related to the operating event of interest. By presenting the identified time series patterns/clusters to plant personnel, steps 150 and 155 further incorporates plant knowledge and expertise into the performance of the automatic search and identification technique. At step 157, the method 100 may also select KPI time series patterns from a signature library.

The method 100, at step 160, automatically defines and confirms a signature (i.e., as a tag or calculated tag) of the operating event of interest based on the KPI time series patterns/pattern clusters identified in steps 130-157. At step 160, the method 100 may define the event signature to comprise one or more time series range (time window) or vary in amplitude, spread, offset, shape, dynamic time warping (DTW) and such. For each time series range, offset, shape, and such, step 160 includes one or more corresponding KPI time series patterns (e.g., contained in pattern cluster) identified (found) in steps 130-157. Step 160 includes the entire identified KPI time series pattern in the event signature, rather than disassembling the KPI time series pattern into primitive components. In other embodiments, a user interface may be provided for a user to interactively define the event signature, which may include options for configuring time series ranges, amplitude, offset, shape, and such for the event signature and selecting one or more corresponding KPI time series pattern (e.g., contained in pattern cluster).

The method 100, at step 170, builds a pattern model for the operating event of interest and adds the defined event signature in the pattern model. The pattern model may be used to monitor for the event signature during online execution of the plant process at the subject plant. The method 100 may also transfer the pattern model to a similar plant, where the pattern may also be used to monitor for the event signature during online execution of the plant process. The method 100, at step 175, adds more event signatures that include the KPI time series patterns identified in steps 130-157, which are also saved in the pattern model. In repeating these steps, method 100 builds the pattern models with different event signatures that account for various aspects of a KPI time series range associated with the operating event of interest. For example, the event signatures may include KPI time series patterns that account for varying amplitude, offset, shape, time, and such in a KPI time series range associated with the operating event of interest. The variation of amplitude, offset, shape, time, and the like may be an indication of undesirable or abnormal conditions associated with the operating event of interest. Further, method 100 may include in the pattern model event signatures containing KPI time series patterns that are precursors for predicting a future occurrence of the operating event of interest (e.g., a KPI for a C2 splitter indicates future occurrence of Ethylene leak). The method 100 may include in the same pattern model event signatures containing KPI time series patterns that are detectors of an ongoing occurrence of the operating event of interest.

The method 100, may then repeat steps 130-175 to define event signatures based on another selected KPI of the operating event of interest, which may be included in the same or different pattern model. The method 100 may further repeat to define event signatures for additional undesirable operating events, which may be included in other pattern models. In addition, when the process operation scheme of the plant changes (revamps), such as producing different product, steps 110-170 may be repeated to build a new pattern model to replace a built model from the previous process operation scheme. The method 100 ends at step 180.

In some embodiments, each of the defined event signatures may be collected, saved, classified, and documented in an event signature library (in step 170). In the event signature library, the event signatures may be organized according to an operating event of interest, KPI associated with the operating event of interest, and such. The method 100 (step 170) may provide a user interface to enable a user to add, delete, and edit (tune) the event signatures in the plant signature library. For example, fine tuning KPI time series patterns of an event signature could accommodate minor structure change or customized operation conditions, such as switching to specially designed catalyst for a reactor. The user interface may further enable the user to create and update pattern models using event signatures from the event signature library. In these embodiments, the event signature library and pattern models may be stored at the plant historian database or other location in a server computer. The user interface may further enable the user to simulate and test the stored pattern models on in an offline or online plant process.

Method of Online Monitoring of Pattern Model

Figure 2:
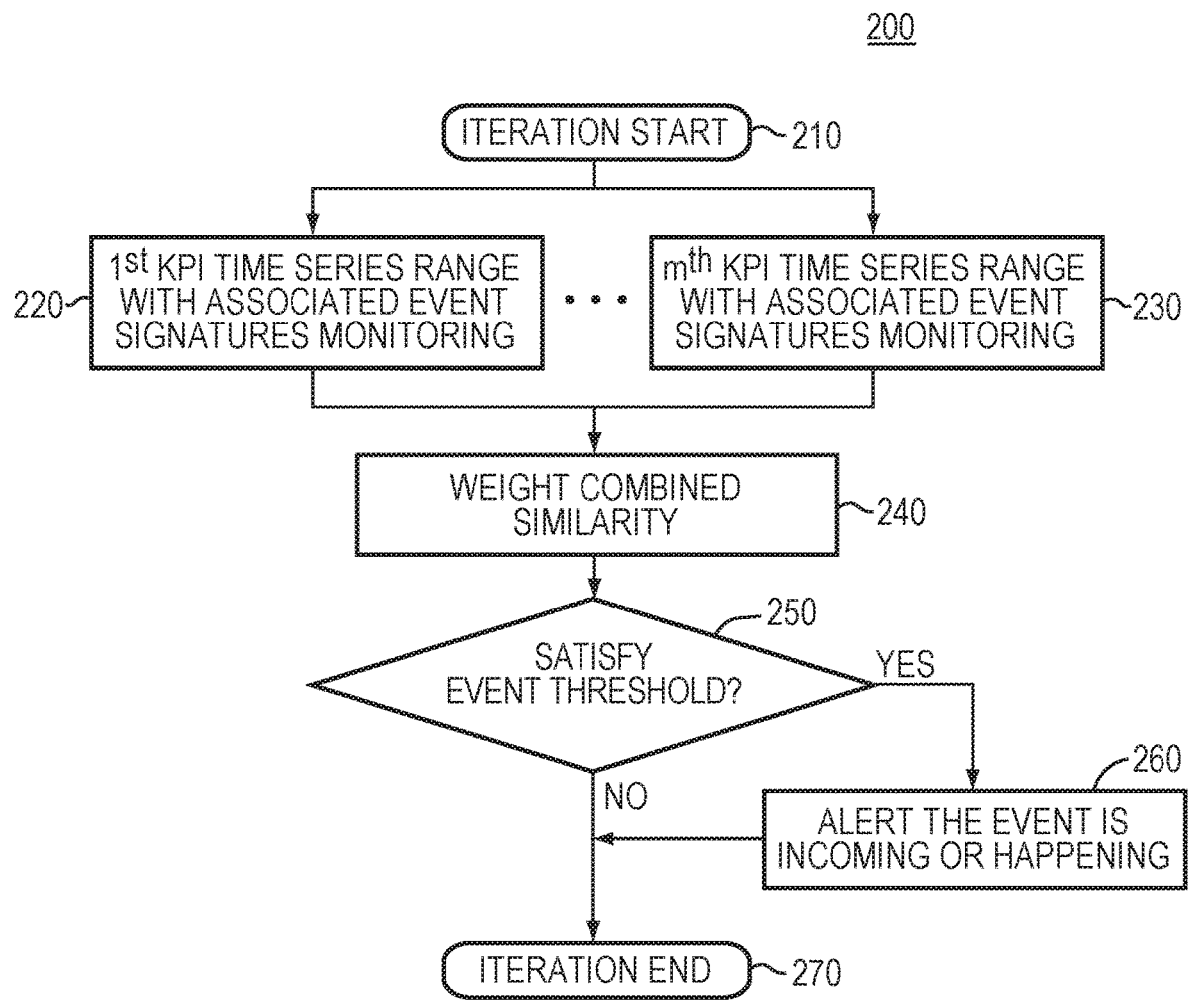
FIG. 2 is a flow diagram depicting an example method of online monitoring and iteration of time series patterns in embodiments of the present invention.

FIG. 2 depicts an example computer-based method 200 of online monitoring and iteration of time series patterns in embodiments of the present invention. Prior to the start of method 200, a plant operations system executes a plant process online at a subject plant (e.g., a refinery or Ethylene plant). The plant operations system also loads a stored pattern model of an undesirable (abnormal) operating event of interest related to the online plant process. In some embodiments, the plant operation system may load multiple event-pattern models together online for improved reliability of the system to monitor and predict one or more operating events of interest. The stored model includes a first set of event signatures for a first KPI of the operating event of interest. Each event signature of the first set contains a time series pattern of the first KPI associated with the operating event of interest. The stored model also includes a second set of event signatures for a second KPI of the operating event of interest. Each event signature of the second set contains a time series pattern of the second KPI associated with the operating event of interest. The stored model also includes up to an $m^{th}$ set of event signatures for an $m^{th}$ KPI of the operating event of interest. Each event signature of the $m^{th}$ set contains time series pattern of the $m^{th}$ KPI associated with the operating event of interest. In some example embodiments, the pattern model was built according to the method 100 of FIG. 1.

The method 200, at step 210, starts an iteration of applying the pattern model (resulting from FIG. 1) to a specified time range (e.g., a short history time duration or portion up to current time) of the online plant process. The iteration may be repeated at a certain time interval scheduled by user. In some embodiments, the specified range may be pre-defined by a user via a user interface, and in other embodiments, the specified range may be automatically determined based on features of the plant process. In the iteration, the method 200, at step 220, executes a first computer process that monitors trends in movement of the first KPI over the specified range of the online plant process (e.g., the KPI value movements over the last two hours). Step 220 monitors the trends in movement of the first KPI (as a time series) of the specified range, referred to as the "first monitored KPI time series." In particular, the first computer process (at step 220) selects associated event signatures from the first set of event signatures (for the first KPI) that contain time series patterns corresponding to the first monitored KPI time series. For each selected event signature, the first computer process compares the time series patterns for the KPI contained in the selected event signature to the first monitored KPI time series. Based on the comparisons, the first computer process determines a level of similarity between the selected event signatures and the first monitored KPI time series, which is output as a distance score.

The method 200, at step 230, executes an $m^{th}$ computer process simultaneously (in parallel) with the first computer process. The $m^{th}$ computer process monitors trends in movement of the $m^{th}$ KPI (as a time series) over the specific range of the online plant process, referred to as the "$m^{th}$ monitored KPI time series." In particular, the $m^{th}$ computer process (at step 230) selects associated event signatures from the $m^{th}$ set of event signatures (for the $m^{th}$ KPI) that contain time series patterns corresponding to the $m^{th}$ monitored KPI time series. For each selected event signature, the $m^{th}$ computer process compares the time series patterns for the KPI contained in the selected event signature to the $m^{th}$ monitored KPI time series. Based on the comparisons, the $m^{th}$ computer process determines a level of similarity between the selected event signatures and the $m^{th}$ monitored KPI time series, which is output as a distance score. The method 200 may similarly execute any number of other computer processes (as indicated by the markings between the $1^{st}$ process 220 and $m^{th}$ process 230) to determine a level of similarity between the corresponding monitored KPI time series and associated selected event signatures.

At step 240, the method 200 receives the distance score for the first KPI from the first computer monitoring process (step 220). At step 240, the method 200 also receives the distance score from each up to the $m^{th}$ computer monitoring process (steps 230. In other embodiments, step 240 may receive a distance score for only one KPI (from a single computer monitoring process). In yet other embodiments, step 240 may receive a distance score for any number of multiple KPIs (e.g., from corresponding monitoring processes in series).

Step 240 assigns a weight coefficient to the distance score for each monitored KPI. For example, step 240 may assign a first weight coefficient to the distance score for the first monitored KPI, up to a $m^{th}$ weight coefficient to the distance score for the $m^{th}$ monitored KPI. The assigned weight coefficients indicate the significance or impact of the corresponding KPI in detecting the operating event of interest. For example, a column pressure difference between a distillation column top and bottom KPI may be more significant in determining a column distillation flooding event than a column pressure KPI. In example embodiments, by default, each distance score is assigned the same weight coefficient of 1, indicating similar significance of the corresponding KPIs in detecting the operating event of interest. In some embodiments, a user (e.g., plant operator) may configure the weight coefficient for each KPI via a user interface. In this way, process domain knowledge can be applied by plant personnel through assigning different coefficients to increase/decrease the influence of a KPI on the overall combined distance score.

Step 240 next performs the real-time operation of calculating the weighted distance score of each monitored KPI into a combined distance score. The method 200, at step 250, then performs the real-time operation of comparing the combined distance score to an event similarity threshold for the operating event of interest. In some embodiments, the method 200 provides a user interface for a user (e.g., plant operator) to define the event similarity threshold for the operating event of interest. If the combined distance score satisfies the event similarity threshold, the method 200, at step 260, detects the current occurrence of the operating event of interest or predicts a future occurrence of the operating event of interest. Step 260 then alters the online process system or operational personal to stop or prevent the occurrence of the operating event of interest based the combined distance score and related information collected by method 200. For example, the method 200 (step 260) may alert and advise operators to adjust parameters (variables) of the online plant process or plant equipment associated with the online plant process to avoid a shut-down, or prevent from, the occurrence of the operating event of interest (adapt process/plant changes in operation conditions).

Step 260 may also only alert (alarm) a user (e.g., plant operation) of the occurrence or predicted (incoming) occurrence of the operating event of interest. The combined distance (similarity) score, event signatures, and pattern model can be further applied to event root-cause analysis based on correlations with available process variable measurements. Detailed example embodiments of root-cause analysis from event KPIs are described in Applicant's U.S. patent application Ser. No. 15/141,701, herein incorporated by reference.

The method 200 completes at step 270 with the termination of the iteration of applying the pattern model to the online plant process. Method 200 may then repeat steps 210-270 to perform a next iteration of applying the pattern model to the online plant process, as scheduled at a certain time interval (e.g. every 10 minutes).

Method of Deploying Pattern Model

Figure 3:
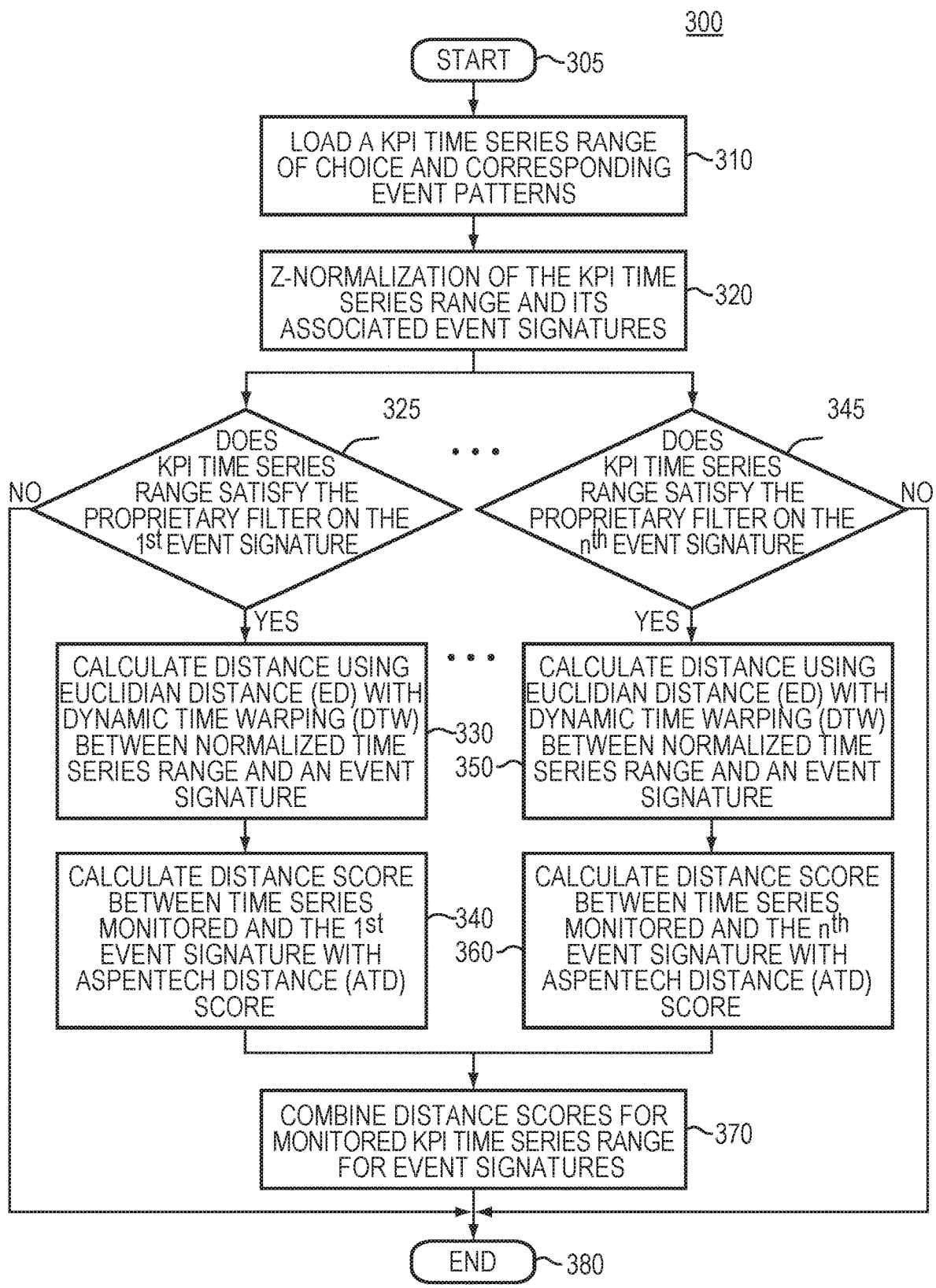
FIG. 3 is a flow diagram depicting an example method of deploying pattern models of FIG. 1 in the online monitoring of FIG. 2 in embodiments of the present invention.

FIG. 3 depicts an example computer-based method 300 of deploying pattern models in embodiments of the present invention. The method 300 is a detailed example embodiment of the step 220 or 230 of method 200 (FIG. 2). The method 300 starts at step 305. The method 300, at step 310, receives time series of a KPI from a specified range of choice for an online plant process, referred to as the "monitored KPI time series." If method 300 is executing an embodiment of step 220, the KPI is the "first KPI," and the monitored KPI time series is the "first monitored KPI time series." If method 300 is executing an embodiment of step 230, the KPI is the "$m^{th}$ KPI," and the monitored KPI time series is the "$m^{th}$ monitored KPI time series," and so forth.

At step 310, the method 300 also receives a set of event signatures in a pattern model for the KPI. If method 300 is executing an embodiment of step 220, the set of event signatures is the "first set of event signatures," and if method 300 is executing an embodiment of step 230, the set of event signatures is the "$m^{th}$ set of event signatures," and so forth. At step 310, the method 300 selects event signatures from the set of event signatures, which each contains a time series pattern for the KPI corresponding in range to the monitored KPI time series. In particular, in the embodiment of FIG. 3, the method 300 selects a first event signature and an $n^{th}$ event signature from the set of event signatures. The first event signature includes a time series pattern for the KPI that vary in at least one of amplitude, offset, shape, or time from the time series pattern for the KPI in the $n^{th}$ event signature. The time series pattern for the KPI from the first event signature is referred to as the "first KPI time series pattern" and the time series pattern for the KPI from the $n^{th}$ event signature is referred to as "the $n^{th}$ KPI time series pattern." By simultaneously applying both the first and the $n^{th}$ event signatures to the monitored KPI time series, the method 300 can monitor, in real-time, different manifestations of the operating event of interest in the online plant process.

In the following descriptions, a data transform called Z-normalization is repeatedly applied, Z-normalization, also known as "Normalization to Zero Mean and Unit of Energy," was mentioned by Goldin & Kanellak, "*On Similarity Queries for Time Series Data: Constraint Specification and Implementation*" (1995), herein incorporated by reference in its entirety. The procedure ensures, that all elements of the input vector are transformed into an output vector with mean approximately 0, while the standard deviation is in a range close to 1. The formula (Equation 1) used in the transform is shown below, where $i \in N$:

$$x'i=(xi-\mu)/\sigma \quad \text{(Equation 1)}$$

First, the time series mean is subtracted from original values, and second, the difference is divided by the standard deviation value. According to most of the recent work concerned with time series structural pattern mining, z-normalization is an essential preprocessing step which allows a mining algorithm to focus on the structural similarities/dissimilarities rather than on the amplitude-driven ones.

The method 300 continues to step 320, where the method 300 performs Z-normalization on the first and the $n^{th}$ event signatures and the monitored KPI time series. Z-normalization converts: (i) the first KPI time series pattern of the first event signature, the $n^{th}$ KPI time series pattern of the $n^{th}$ event signature, and the monitored KPI time series to a common scale. For example, the Z-normalization removes impacts of amplitude, offset, shape, and such from the first KPI time series pattern and the $n^{th}$ KPI time series pattern, and the monitored KPI time series. After the conversion of the KPI time series patterns and monitored KPI time series, method 300, at step 325, checks if the monitored KPI time series range satisfies a proprietary filter (e.g., amplitude spread) placed on the first event signature to remove false positives. If so, the method, step 325, transmits the event signature to a separate computer process, along with the monitored KPI time series.

In particular, after conversion, step 325 transmits the first event signature to a first computer process 330, along with the monitored KPI time series. The first computer process (step 330) calculates an Euclidean distance with dynamic time warping (DTW) between the first KPI time series pattern and the monitored KPI time series. To enable the first computer process to calculate the distance in real-time, the typical upper bound used for the DTW is 10%, as a larger upper bound will slow calculation of the distance significantly. The use of Euclidean distance with DTW allows for the method 300 to accommodate small time duration variation in the calculation of the distance.

To calculate the Euclidean distance with DTW, step 330 inputs the first KPI time series pattern and monitored KPI time series into a Euclidian Distance (ED) with DTW function, for example, as shown in Equation 2. In other embodiments, the standard Euclidean distance function may be used.

$$ED(A,B)=\sqrt{\Sigma_{i=1}^{n}(a_i-b_i)^2} \quad \text{(Equation 2)}$$

In Equation 2, A is the first KPI time series pattern, after being converted by Z-normalization; and $a_i$ is the ith object of the converted first KPI time series pattern B is the monitored KPI time series, after being converted by Z-normalization; and $b_i$ is the ith object of the converted monitored KPI time series, and n is the length of A and B. In practice, A and B may be not well aligned in time and a correction may be made by DTW algorithm. An example process to calculate a distance using an Euclidian distance function with DTW is disclosed in "*Exact indexing of*

*dynamic time warping,*" by E. Keogh, et al, Knowledge and Information Systems (2004), which is herein incorporated by reference.

Some embodiments provide a new distance criterion, which may be referred to as Aspen Tech Distance (ATD), which measures similarities of a given length of a time series against a pattern library model. The ATD has similar mathematical properties to the conventional Euclidian Distance, but it has several advantages over Euclidian Distance for process industrial applications. As part of the ATD, Equation 2 calculates the Euclidian Distance with DTW (ED(A, B)) between the first KPI time series pattern and the monitored KPI time series. In other embodiments, a standard Euclidean Distance may be used. By calculating the Euclidean distance with DTW, the method 300 directly determines the distance between the first KPI time series pattern (as a whole) and the monitored KPI time series, rather than disassembling the first KPI time series pattern into primitives, applying similarity matrix, and such.

The calculated distance (ED(A, B)) becomes the smaller the closer the similarity is between the first KPI time series pattern and the monitored KPI time series. For example, if first the KPI time series pattern perfectly matched the monitored KPI time series (i.e., closest possible similarity), Equation 2 would calculate a distance of 0. Note that in Equation 2, the data sampling rates used in originally measuring the KPI time series pattern and the monitored KPI time series affects the value of the calculated distance. For example, if the same first KPI time series pattern is measured at a higher data sampling rate and a lower data sampling rate respectively, Equation 2 would output a larger distance between the first KPI time series pattern and the monitored KPI time series for the higher data sampling rate than the lower data sampling rate.

The method 300, at step 340, inputs the calculated distance (ED(A,B)) to an ATD distance scoring function. Based on the calculated distance, the ATD distance scoring function measures the similarity between the first KPI time series pattern and the monitored KPI time series to compute a first distance score. The ATD distance score function is defined as follows in Equation 3:

$$ATD(A, B) \equiv \max\left[0, 1 - \left(\frac{ED(A, B)}{ED(A, \text{zeroline})}\right)\right] \quad \text{(Equation 3)}$$

In Equation 3, ED(A,B) is the Euclidian distance calculated from Equation 2 in step 330. A is the first KPI time series pattern, after being converted by Z-normalization. B is the monitored KPI time series, after being converted by Z-normalization. The zero-line is a constant vector of zeros of the same length as the monitored KPI time series, and ED (A,zero-line) is the Euclidian distance calculated between A and zero-line. There are two advantages by using ATD distance score instead of ED to measure similarity: (i) the distance scores are rescaled from zero (smallest similarity) to one (highest similarity), which matches most engineering measurement scales, is easy to understand for process operation personals; (ii) the ATD distance score is not sensitive to pattern sampling rate (e.g., when the sampling time interval changed, the ATD scores are still valid for comparisons of two time series patterns with different sampling rate).

Step 340, using Equation 3, calculates an distance score (ATD(A,B)) that has a value in the range 0 to 1. That is, if step 340 applies ATD(A,a) across each object i in a large dataset, the distribution of the distance score ATD(A,a) spans the full range [0, 1], rather than being confined to a smaller range, such as [0.95 to 0.97]. The more similar the monitored KPI time series (B) is to the first KPI time series pattern (A), the closer the distance score ATD(A,B) is to 1. Whereas the less similar the monitored KPI time series (B) is to the first KPI time series pattern (A), the closer the distance score ATD(A,B) is to 0. Further, Equation 3 calculates ATD(A,B) to be essentially independent of (immune to) the data sampling rate used to measure A and B. That is, for the same first KPI time series pattern (A) and monitored KPI time series (B), Equation 3 calculates approximately the same distance score, regardless of whether A and B were measured using a higher or lower data sampling rate. As such, the impact of the data sampling rate in the calculated distance (ED(A,B)) by Equation 2 is essentially eliminated when converting the calculated distance into the distance score (ATD(A,B)).

Further, the formulation of distance scoring function in Equation 3 enables real-time calculation of the distance score (ATD(A,B)). That is, the ATD distance function being formulated based on Euclidian distance and DTW provides fast calculation of the ATD distance score, with inconsequential central processing unit (CPU) overhead and inconsequential computer memory usage. Thus, the use of the ATD distance scoring function enables method 300 to perform real-time analysis of the KPI time series in comparison to the first KPI time series patterns contained in the first event signature.

The method 300, at step 345, similarly checks if the monitored KPI time series range satisfies a proprietary filter (e.g., amplitude spread) placed on the $n^{th}$ event signature to remove false positives. If so, the method, step 345, transmits the event signature to an $n^{th}$ computer process, along with the monitored KPI time series. In steps 345-360, the $n^{th}$ computer monitoring process simultaneously calculates a $n^{th}$ distance score, indicating the similarity between the $n^{th}$ KPI time series pattern of the $n^{th}$ event signature and the monitored KPI time series. Steps 350-360 calculate the $n^{th}$ distance score in the same manner that steps 330-340 calculated the first distance score, as described above, and so forth for other event signatures and the monitored KPI time series between the first and the $n^{th}$. The method similarly calculates a distance scores for up to n event signatures and the monitored KPI time series.

At steps 370, the method 300 receives the first distance score from the first computer monitoring process (step 340). Also at step 370, the method 300 further receives up to the $n^{th}$ distance score from the respective computer monitoring process (step 360). In other embodiments, step 370 may receive distance scores in from a single computer monitoring process (for a single event signature) or any number of multiple monitoring processes (for the same or different number of event signatures). Step 370 may assign a different weight coefficient to the distance score received from each computer monitoring process based on the corresponding event signature. The assigned weight coefficient assigned by step 370 indicates the significance of the corresponding event signature in detecting the operating event of interest. In some embodiments, by default, each received distance score is assigned the same weight coefficient of 1, indicating similar significance of the corresponding event signatures in detecting the operating event.

The method 300, at step 370, then performs the real-time operation of computing the weighted distance scores into a combined distance score for the monitored time series, which is performed in real-time. Step 370 also may apply the filters (e.g., proprietary filters) of the respective event signatures to eliminate certain similarities, which would cause false operating event detection, when computing the combined distance score. For example, step 370 may filter out perfect shape-wise matches between a KPI time series pattern and monitored KPI time series, whereas the matches have negligible amplitude variation during monitoring duration. Step 370 may also tune time series patterns for the KPI to accommodate minor structure change or customized operation conditions, such as switching to specially designed catalyst for a reactor. The higher the combined distance score from step 370, the higher the probability of the occurrence of the operating event of interest associated with the first and $n^{th}$ event signature. The method 300 ends at step 380.

System for Building and Deploying Pattern Models

Figure 4:
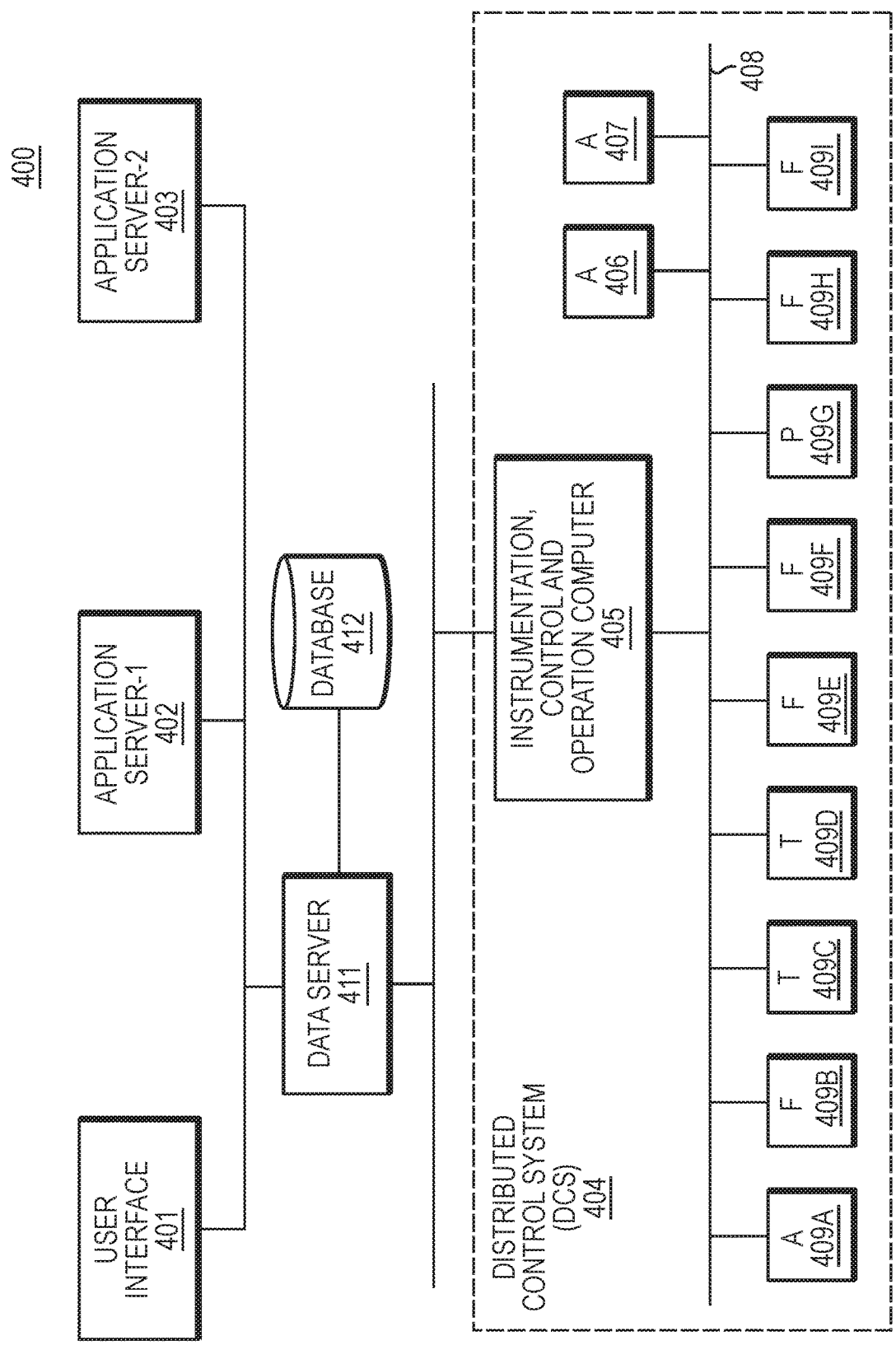
FIG. 4 is a block diagram depicting of an example computer system for deploying a pattern model using the methods of FIGS. 1-3 in embodiments of the present invention.

FIG. 4 depicts an example system 400 for building and deploying pattern models in embodiments of the present invention. The system 400 may be configured as part of the computer network of a chemical or industrial plant (e.g., a refinery). In some embodiments, the system 400 executes the methods of FIGS. 1-3 to build, monitor, and deploy pattern models.

The system 400 includes a first application server 402 configured as a modeler engine. The first application server 402 is communicatively coupled to a user interface 401. From the user interface 401, a user (e.g., domain expert, plant operator or other plant personnel) may initiate building of a pattern model. As part of building the pattern model, the user may, via the user interface 401, define a set of event signatures for a KPI of an operating event of interest. To do so, the user may first select the KPI from the available variables for the plant process. The user may then, via the user interface 401, configure time series patterns of the KPI to be used to define each event signature. Based on a selection by the user on the user interface 401, the modeler engine 402 may load historical plant data, via the data server 411, from a historian database 412. The historical data may include data collected from sensors, including 406-407, by the Instrumentation, Control, and Operation Computer 405 of the Distributed Control System (DCS) 404.

The modeler engine 402 may present the historical data to the user (e.g., domain expert) on the user interface 401. The user interface 401 may be configured to enable the user to review the historical data as a time series (e.g., in graphical or other format) and identify time series patterns for the KPI that are associated with the operating event of interest. The user interface 401 may also be configured for the user to load operator logs, and, in communication with the modeler engine 402, compare the operator logs to the loaded historical data to identify time series patterns for the KPI associated with the operating event of interest. The user interface 401 may further be configured for the user to initiate performance of a pattern search and identification technique (e.g., Motif pattern search and discovery technique) on the loaded historical data. This technique may be an unsupervised pattern discovery technique or a supervised (user-guided) pattern discovery technique as described below). The modeler engine 402 may perform the technique to identify repeated time series patterns associated with the operating event of interest. The modeler engine 402 may present the identified repeated time series patterns to the user to confirm the patterns as a time series related to the operating event of interest.

Based on the identified patterns, the user, via the user interface 401, may configure the set of event signatures for the selected KPI. The user may define an event signature by configuring a time series range for the selected KPI, and selecting one of the identified KPI time series patterns corresponding to the configured time series range. In some embodiments, the modeler engine 402 may instead automatically (e.g., without human intervention) configure the KPI time series range and select a corresponding identified KPI time series pattern for the event signature. The modeler engine 402 includes the whole identified KPI time series pattern into the event signatures, rather than disassembling the KPI time series pattern into primitives. The set of event signatures for a KPI may be configured to account for varying amplitude, offset, shape, time, and such in the selected KPI time series patterns. The modeler engine 402 saves the configured set of event signatures into the pattern model. The model engine 402 may also save the set of event signatures, via the data server 411, to an event signature library configured at the historian database 412 for later use in configuring a different pattern model. The user may similarly configure additional sets of event signatures for other KPIs of the operating event of interest, and save the additional sets into the pattern model.

The system 400 also includes a second application server 403 configured as an parallel modeler engine (or analysis engine). The second application server 403 is communicatively coupled to a user interface 401. The user, via the user interface, 401 may select the pattern model for deployment for monitoring trends in movement (time series) of a KPI in an online plant process. The Instrumentation, Control, and Operating Computer 405 may provide the data comprising the time series of the KPI to the analysis engine 403, in real-time, based on measurements collected from physical sensors 406-409. For a given KPI, a computer monitoring process applies the respective set of event signatures to monitor time series of the KPI during a specified range (e.g., time duration or portion) of the online plant process. The computer monitoring process selects a first event signature from the set that corresponds to the specific range of the online plant process. The computer monitoring process compares the KPI time series pattern contained in the first event signature to the monitored KPI time series. In performing the comparison, the analysis engine performs Z-normalization on the KPI time series pattern and the monitored KPI time series. The computer monitoring process uses Equation 2 (detailed above) to calculate a Euclidean distance with DTW between the KPI time series pattern and monitored KPI time series. The computer monitoring process further determines a distance score based on the calculated Euclidean distance and a Euclidean calculated with a zero-line, as shown in Equation 3.

The computer monitoring process (e.g., by executing sub-processes in parallel) similarly calculates distance scores for one or more additional event signatures associated with the KPI. The computer monitoring process combines the distance scores into a combined distance score for the KPI. One or more other computer monitoring processes similarly calculate combined distance scores for one or more other KPIs by applying respective sets of event signatures. Each KPI may be assigned a weight coefficient by the user via the user interface 401, which is applied to weight the combined distance score for the KPI. The weighted combined distance scores and further combined into a total distance score for the operating event of interest.

The analysis engine 403 may display the total distance score to a user (e.g., plant operator or other plant personnel) on the user interface 401 as an indicator of the probability of occurrence of the operating event of interest. If the total distance score meets a threshold event level, the parallel modeler engine 403 may automatically present an alert (alarm) via the user interface 401 to the user indicating the high probability of the current occurrence of the operating event of interest or predict a future occurrence of the operating event of interest. If the total distance score meets the threshold event level, the modeler engine 403 may also automatically provide input (adjust parameters/variables/constraints) at the Instrumentation, Control, Operation Computer 405 in the Distributed Control System (DCS) 404 in response to the occurrence of the operating event of interest. The Instrumentation, Control, Operation Computer 405, based on the input, may then automatically adjust (via network 408) physical valves, actuators, heaters, and the like 409A-409l to prevent, stop, or alter the occurrence of the operating event of interest. In this way, embodiments improve (and further automate) the process control technology here to fore machined by the previous art.

Supervised (User-Guided) Pattern Discovery

Embodiments of the present invention provide a user-guided pattern discovery technique for automatically locating KPI time series patterns in plant historian data.

Previous approaches of automatic pattern discovery employ un-guided pattern discovery techniques. For a given time series, an automatic query performed by an un-guided pattern discovery technique typically returns the top N repeatable "event like" pattern clusters satisfying the constraints provided to the technique, such as event duration. Each returned pattern cluster from this technique includes one or more automatically identified time series patterns. These identified time series patterns may not contain the particular time series patterns that a user (plant/process engine or system) wants to locate for an event pattern model. These particular time series patterns may not be located because the implementation of the un-guided pattern discovery technique only returns the top N (most similar) clusters for practical reasons, due to the huge number of possible combinations of pattern clusters contained in a time series. The pattern discovery algorithms also favor identification of normal operation/trivial patterns and simpler patterns, such as straight line, slope, etc. Thus, using the un-guided pattern discovery technique, the user: (1) has no input (influence) on the time series trends/patterns that are identified during the discovery process, and (2) must evaluate and confirm the time series trends/patterns as an action after performance of the pattern discovery.

Figure 5A:
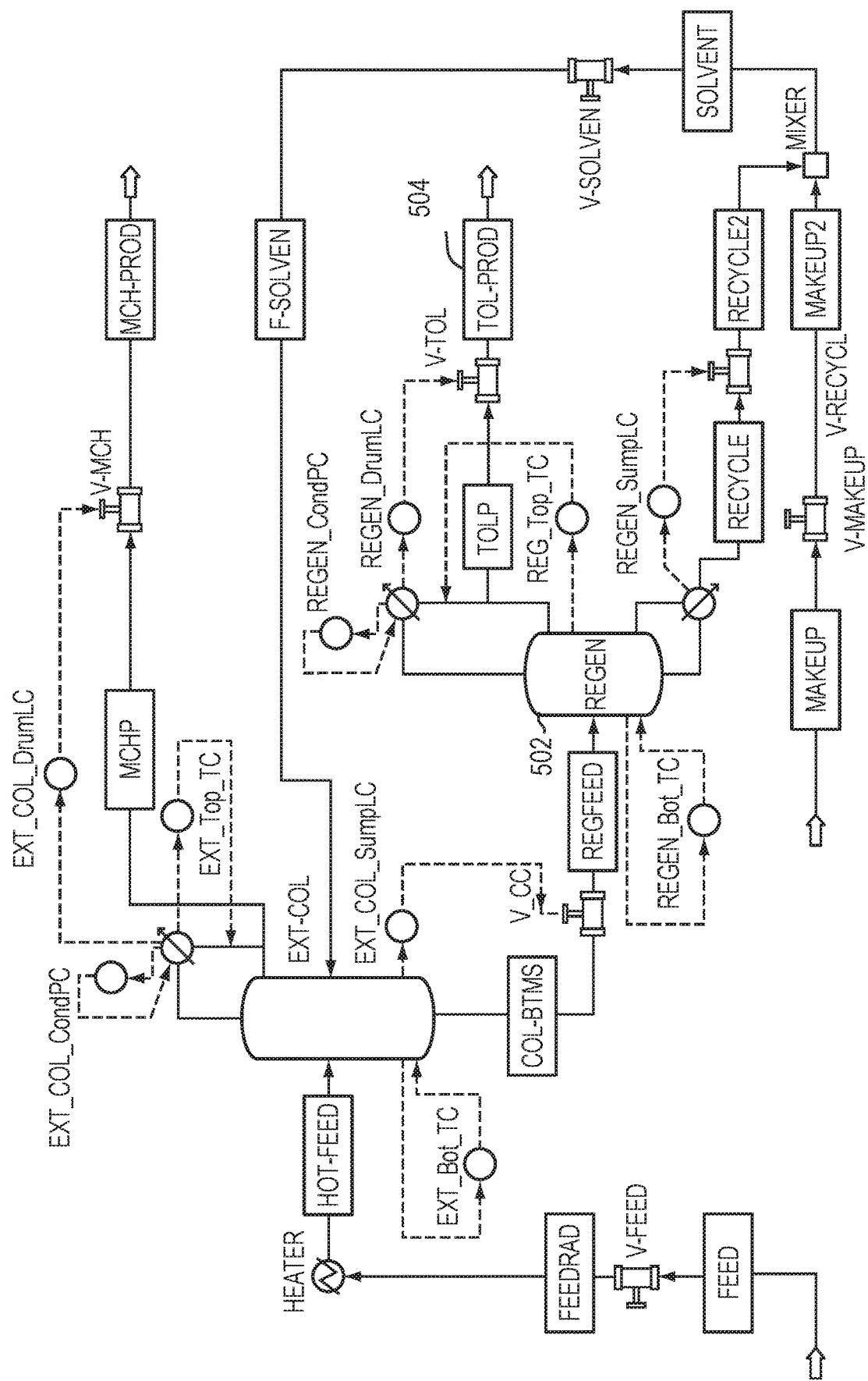
FIGS. 5A-5E are diagrams depicting an example guided pattern discovery technique in embodiments of the present invention.
Figure 5B:
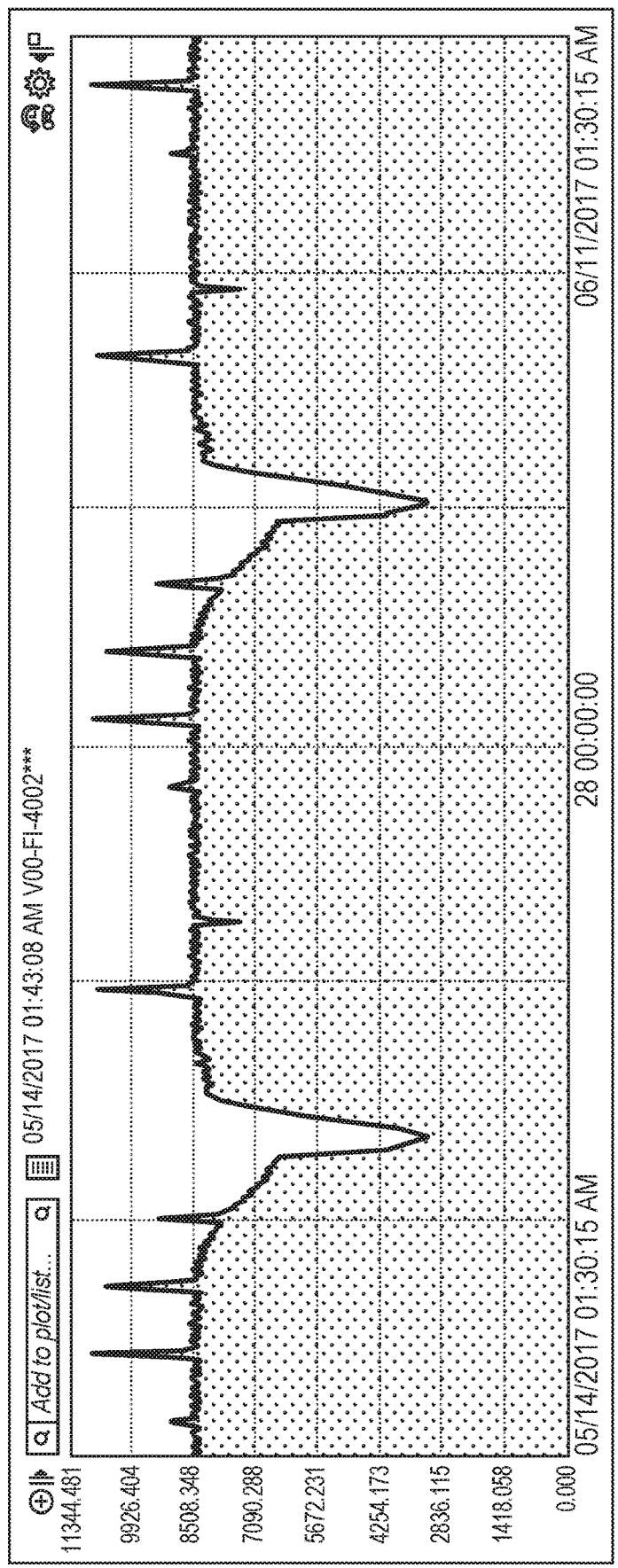

For example, FIG. 5A depicts a flowsheet of a plant section that includes a distillation column (REGEN) 502 having a liquid distillation stream (TOL-PROD) 504. The distillation column (REGEN) 502 separates Methylcyclohexane from toluene using phenol as a solvent. FIG. 5B depicts a trend chart of the process variable (V00-F1-4002) used for measuring the flowrate of the liquid distillation stream (TOL-PROD) 504. The process variable (V00-F1-4002) may be used as a KPI for an operating event of interest related to the flowrate of the distillation column 502. FIG. 5B illustrates the time series of measurements captured for V00-F1-4002 over a four week period. A user (e.g., process engine or system) may need to discover any repeated peaks or dips to locate abnormal operating conditions in the measurements captured for V00-F1-4002 to build a pattern model for V00-F1-4002.

However, since anomalies rarely occur in the operating conditions of the liquid distillation stream (TOL-PROD) 504, the user may need to analyze a long history (time series) to discover any repeated patterns indicating abnormal operating conditions. The time series of measurements captured for V00-F1-4002 over four weeks (as shown in FIG. 5B) may be insufficient to discover such repeated patterns.

Further, analyzing (e.g., query or manually browsing) the time series of measurements captured over a likely sufficient period, such as over the last ten years, to discover repeated anomaly patterns distributed randomly in the time series would not be feasible due to the significant time required to perform such an analysis. Further, using the traditional un-guided pattern discovery technique query (with pattern length configured to 4 hours), the user analyzing the measurements captured for V00-F1-4002 over a four week (28 day) period, as shown in FIG. 5B, may only return the top-6 repeatable "event like" pattern clusters shown as graphs in FIG. 5C, which include graphed cluster 510 (having 68 patterns), graphed cluster 512 (having 89 patterns), graphed cluster 514 (having 44 patterns), graphed cluster 516 (having 20 patterns), graphed cluster 518 (having 21 patterns), and graphed cluster 520 (having 10 patterns).

Figure 5C:
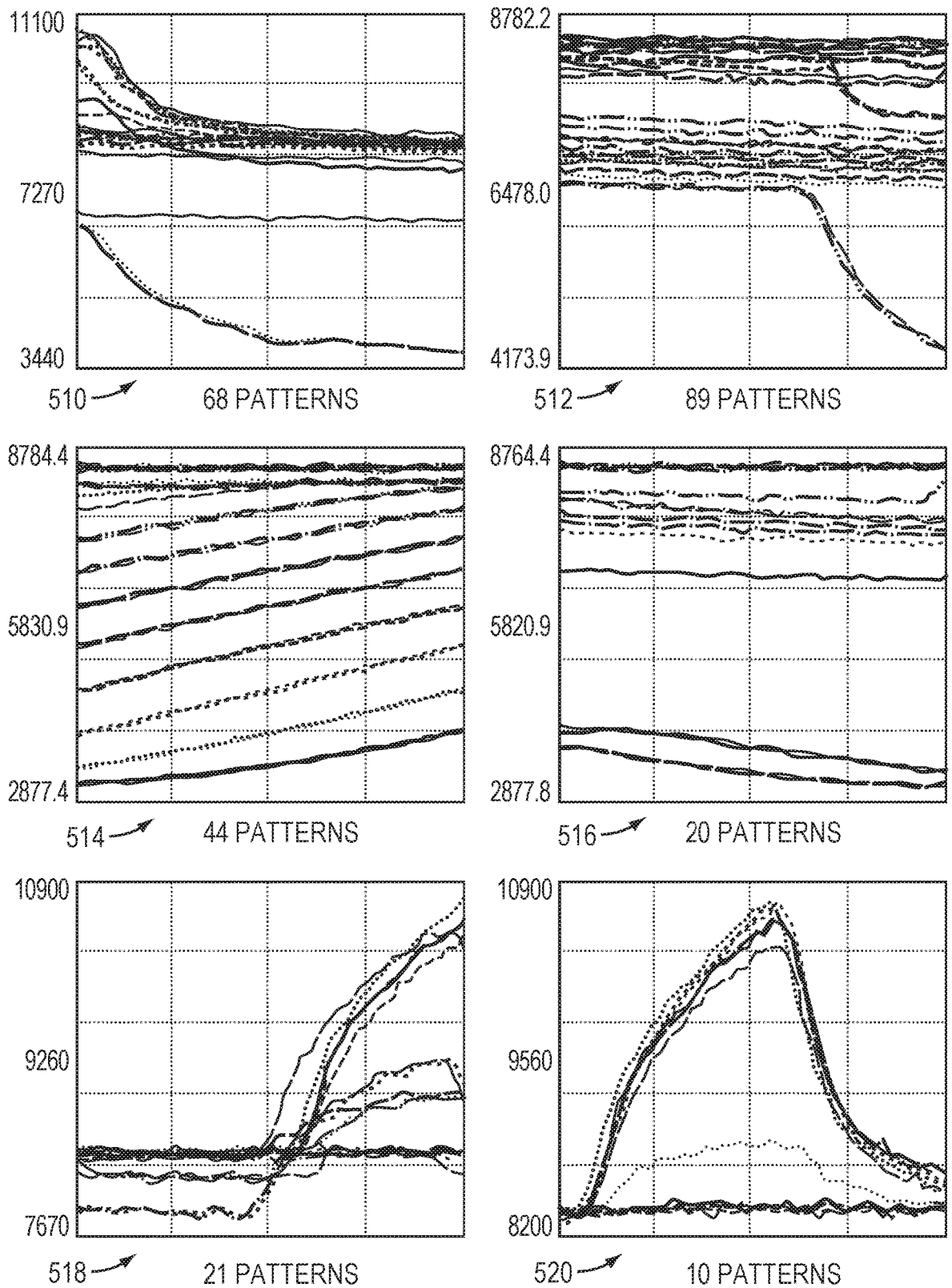

In addition, the traditional (un-guided) pattern discovery techniques favor the identification of operation patterns in a time series that (i) contain trivial operation patterns and (ii) correspond to normal operating conditions. The traditional pattern discovery technique takes a longer time to identify (locate) in a time series non-trivial (simple) operation patterns over trivial operation patterns, and even a longer time to identify in a time series patterns that correspond to anomaly operating conditions than patterns that correspond to normal operating condition. Further, using the traditional pattern discovery technique, the top-N pattern discovered clusters typically contain mostly normal operation events, because a real industrial process intends to operate at stable modes to maximize profits, operation efficiency, and such. For example, the normal operation flow rate for TOL-PROD 504 is at stable operations of about 8508 Kg/Hour and with the expectation of only small noise oscillation (as shown in graphed cluster 512 of FIG. 5C). Plant processes are optimized such that ideally anomaly (peaks, dips, run away, run down, and other such operation patterns) would be a very small fraction during a plant operation. Thus, normal operation patterns (subsequences) in a plant process likely repeat many times and dominate the pattern discovery result when using a tradition pattern discovery technique (as shown in FIG. 5C).

The traditional (un-guided) pattern discovery techniques customarily favor simple (non-trivial) shapes, such as nearly straight lines, sloped lines, stepwise lines, and the like, in the patterns of the top-N discovered pattern clusters because the traditional techniques simply use Euclidean distances. The Euclidean distances between simple shapes (as shown in pattern clusters 510, 512, 514 and 516) after Z-normalization are typically much small than the Euclidean distances among complicate shapes (as shown in pattern cluster 520).

Using the traditional pattern discovery technique, a user may need to expand the N number of top pattern clusters to a large number in order for the technique to return pattern clusters beyond the pattern clusters containing trivial/normal operation patterns. For example, in FIG. 5C, the tradition technique starts to return an anomaly peak pattern cluster 520 when N=6 (configured to generated the top-6 pattern clusters). If the traditional technique was configured to only return the top-4 pattern clusters (N=4), the returned pattern clusters 510, 512, 514, 516, would mostly contain these trivial normal operation conditions and not return the desired patterns of pattern cluster 520, which represent the undesirable (anomaly) operating event of interest. However, by configuring more top rated pattern clusters (N=6 versus N=4) to be discovered and returned by the traditional technique, a longer time period is required for the traditional technique to complete a query returning the pattern clusters and a longer time period is required for a user (e.g., process engine or system) to analyze the time series history represented by the returned pattern clusters. Thus, using the traditional technique, the longer time period likely required to return and analyze a time series history to locate desired patterns corresponding to an anomaly (undesired) operation event of interest may an immensely time consuming process.

Embodiments of the present invention provide a user-guided pattern discovery technique that improves over the traditional (unguided) techniques by enabling a user (e.g., process engine or system) to influence the pattern discovery process in building pattern clusters for a time series of a process variable (KPI) to identify an undesirable (anomaly) operating condition of interest. In particular, the user may configure pattern characteristics that are desired to be included or excluded in pattern clusters identified during a pattern discovery technique. The user may specifically configure the pattern characteristics to not include normal operation patterns, simple (trivial) patterns, and such. By skipping off (trimming) patterns with undesirable pattern characteristics from the discovery process (or focus on patterns with undesirable pattern characteristics in the discovery process), reduced time is needed for the discovery technique to identify patterns in the time series data for use in building the pattern clusters. In addition, the identified patterns (based on specific configured pattern characteristics) are more likely the desired patterns that correspond to the anomaly (undesired) operation event of interest, which further reduces the time required for the user to analyze a time series history to locate these desired patterns.

Figure 5D:
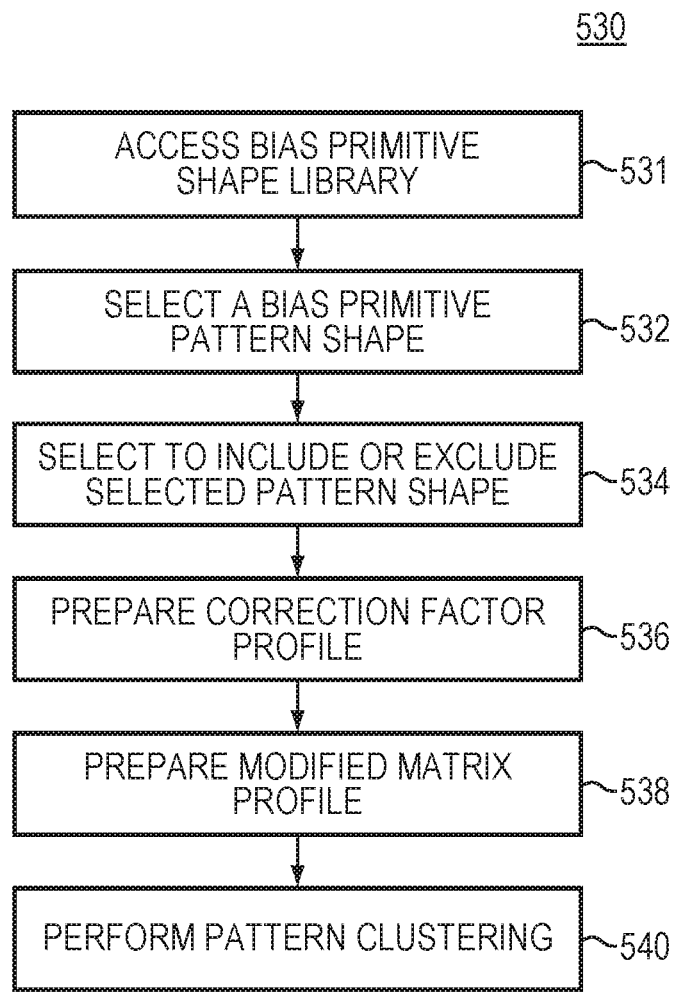
Figure 5E:
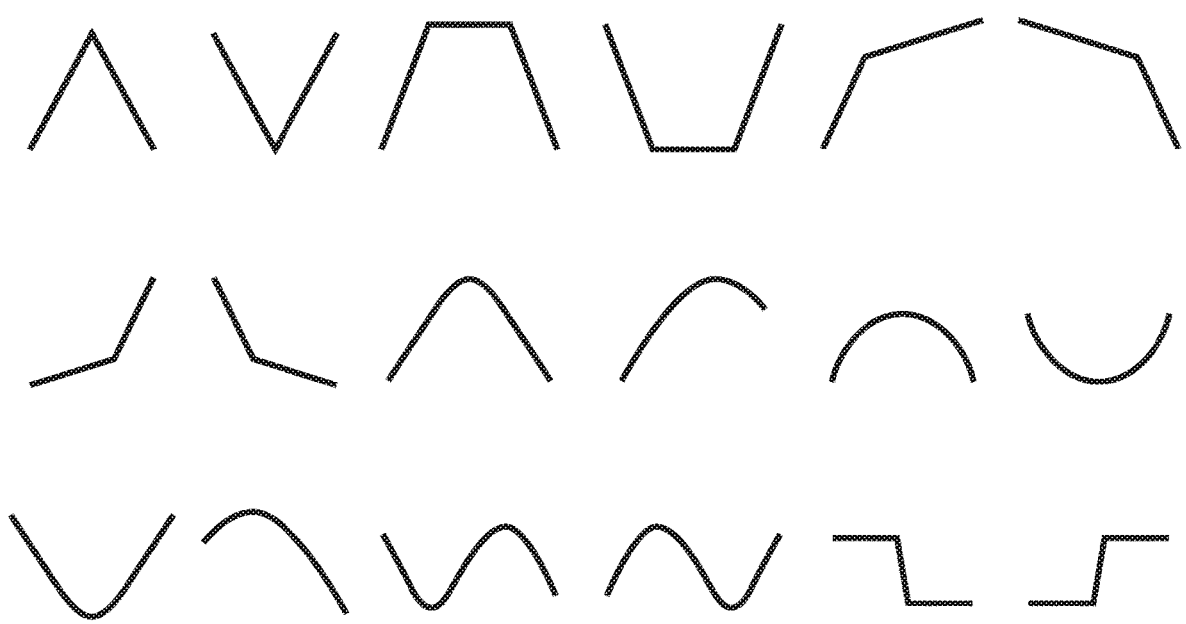

FIG. 5D depicts a method 530 of performing guided pattern discovery in embodiments of the present invention. The method 530, at step 531, enables a user (e.g., process engine or system) to access a bias primitive shape library that include pattern shapes, such as bell-shaped peak, rising, sinking, and the like, that represent pattern characteristics that are desired to be included or excluded in pattern clusters built during pattern discovery. FIG. 5E shows some example pattern (bias primitive) shapes that may be included in the bias primitive shape library in embodiments of the present invention. In other embodiments, the library may include non-primitive pattern shapes. In some embodiments, the user may add pattern shapes into the library (e.g., draw a pattern shape on a drawing pane of a user interface, load a document containing one or more pattern shapes, and the like), remove pattern shapes from the library, edit pattern shapes in the library, and such. The method 530, at step 532, enables a user to select one or more of the pattern shapes from the shape library in order to execute pattern discovery. In some embodiments, the user may in addition or instead dynamically (on the fly) select pattern shapes from an annotation range, draw a pattern shape ad hoc on a drawing pane, load a document (e.g., in CSV or other format) to define a pattern shape, and such.

The method 530, at step 534, enables a user to choose to include or exclude the selected one or more pattern (bias primitive) shapes when discovering (locating) pattern clusters in a time series of a process variable (KPI). In an example embodiment, the process variable (KPI) is V00-F1-4002 of FIG. 5B. If the user chooses to include the selected pattern shape, the executed pattern discovery technique will attempt to discover the selected one or more pattern shapes in the time series of the process variable. If the user chooses to exclude the selected pattern shape, the executed pattern discovery technique will apply a pattern penalty value to discourage discovery of the one or more selected pattern shape in the time series.

Based on the selected pattern shape (and choice to include or exclude), the method 530, at step 536, determines (prepares) a correction factor profile that is the same length as the original matrix profile for the time series of the process variable (KPI). The correction factor profile is a distance profile calculated between the selected (included or excluded) pattern shape and the entire time series for the process variable (KPI). In some embodiments, step 536 calculates the distance between the selected pattern shape and entire time series for the process variable by use of the ATD, as shown in Equation 3, rather than simply using the Euclidean distance. The method 530, at step 538, then determines (prepares) a modified matrix profile for the time series of the process variable (KPI) that combines (1) the original matrix profile for the time series and (2) the correction factor profile for the selected pattern shape. If an original matrix profile for the time series does not currently exist, the step 538 calculates a standard (original) matrix profile with scalable time series ordered-search matrix profile (STOMP), scalable time series anytime matrix profile (STAMP), or the like. The guided pattern discovery technique stores (caches) the calculated original matrix profile and corresponding raw data vector for future use.

The method 530, at step 540, initiates the guided pattern discovery technique to perform pattern clustering based on the selected pattern shape (biased characteristics) using the modified matrix profile. The method 530 may then repeat steps 531-540 to conduct another guided pattern discovery technique on the same time series. As the method 530 caches the original and/or modified matrix profile for reuse, the method 530 requires a decreased time to conduct another guided pattern discovery technique. The method 530 may further repeat steps 531-540 to conduct guided pattern discovery technique on different time series for different or the same process variable (KPI).

Graphical Examples of Calculating Distance Score

Figure 6A:
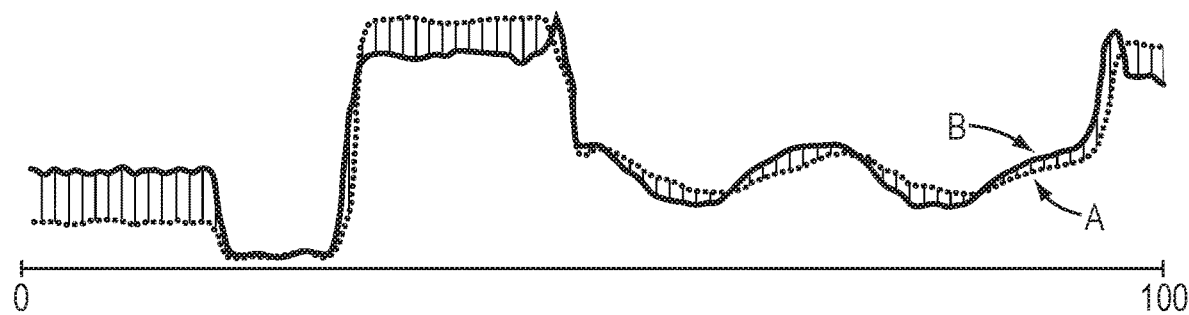
FIGS. 6A-6D are graphs depicting example distance computations used in embodiments of the present invention.
Figure 6B:
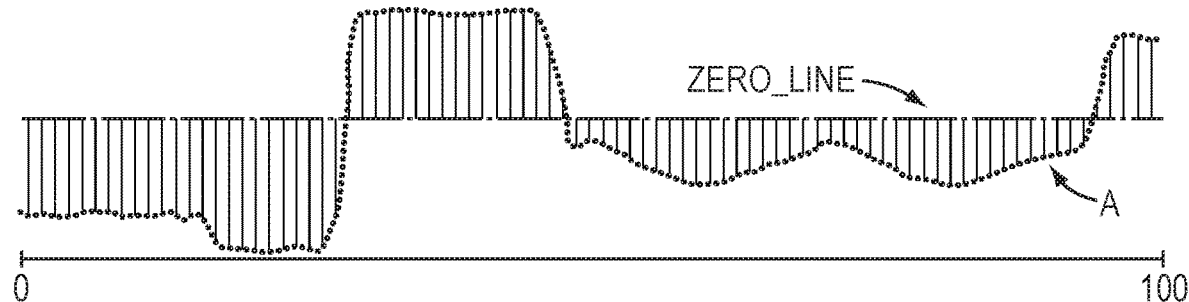
Figure 6C:
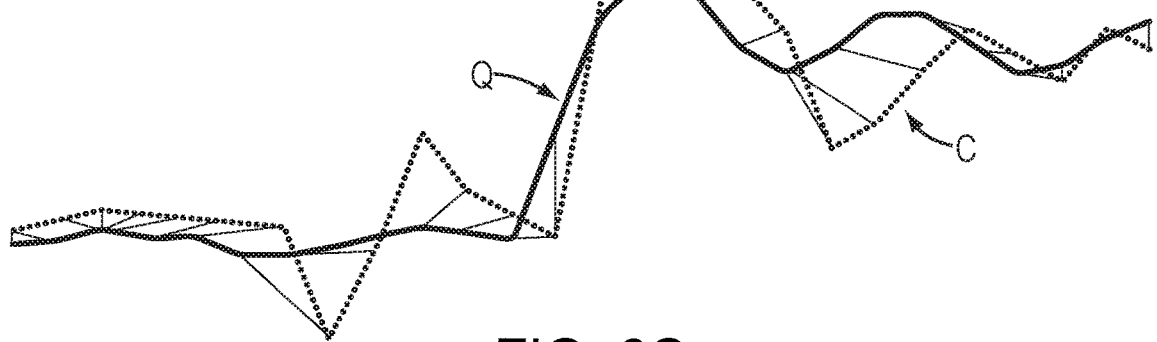

FIGS. 6A-6C illustrates the determination of a distance score in embodiments of the present invention. FIG. 6A illustrates, in graphical format, a KPI time series pattern (A) contained in an event signature of a pattern model. The KPI time series pattern is associated with an operating event of interest. FIG. 6A shows, in graphical format, a monitored KPI time series (B) of a specific range of an online plant process. The KPI time series pattern (A) and monitored KPI time series (B) were Z-normalized prior to depiction in FIG. 6A. In FIG. 6A, a distance (as graphically shown by the vertical lines) is calculated between A and B using the Euclidean Distance formula as shown in Equation 2. In FIG. 6B, a zero-line distance (as graphically shown by the vertical lines) is calculated by between A and a zero-line using the Euclidean Distance formula shown in Equation 2 (or a standard Euclidean Distance formula in some embodiments). The zero-line is a constant vector of zeros of the same length as B. FIG. 6C illustrates a distance calculated between A and B using the Euclidean Distance formula as shown in Equation 2 with DTW.

Figure 6D:
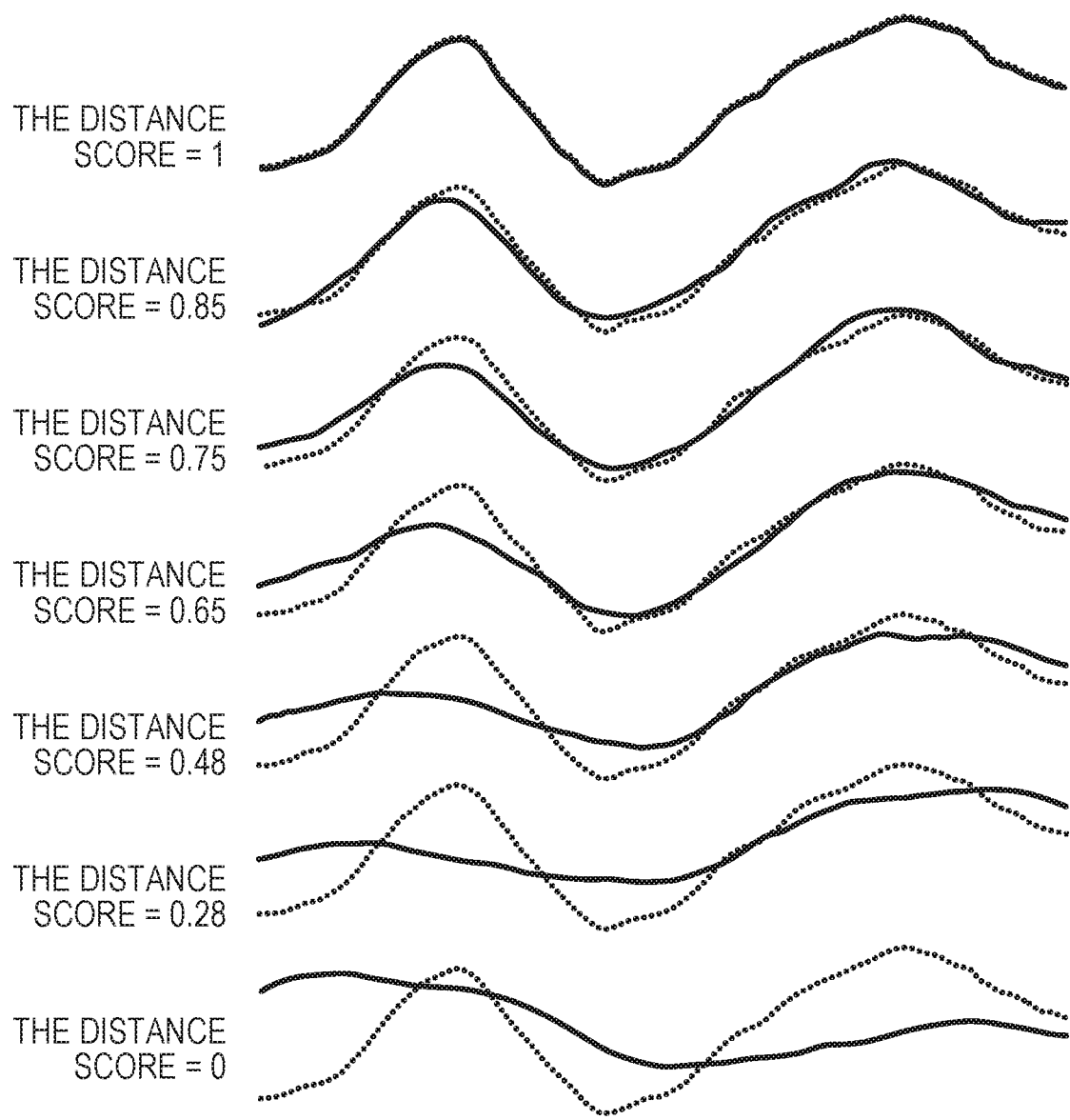

The calculated distance of FIG. 6A or 6C and the calculated distance of FIG. 6B may then be used in Equation 3 to calculate a distance score ATD between A and B, which illustrates the probability of the monitored KPI time series (B) indicating an occurrence of the operating event of interest. FIG. 6D illustrate example ATD distances, calculated in accordance with FIG. 6A-6C, from different values of A (shown in solid lines) and B (shown in dotted lines). The top graph of FIG. 6D shows an identical match between the KPI time series pattern (A) and monitored KPI time series (B), resulting in an ATD distance score of 1. The distance score of 1 illustrates complete likelihood that the monitored KPI time series (B) indicates occurrence of the operating event of interest (identified by the KPI time series pattern (A)). On the other hand, the distance score of 0 in the bottom graph of FIG. 6D indicates no likelihood that the monitored KPI time series (B) indicates occurrence of the operating event of interest (identified by the KPI time series pattern (A)).

Digital Processing Environment

Figure 7:
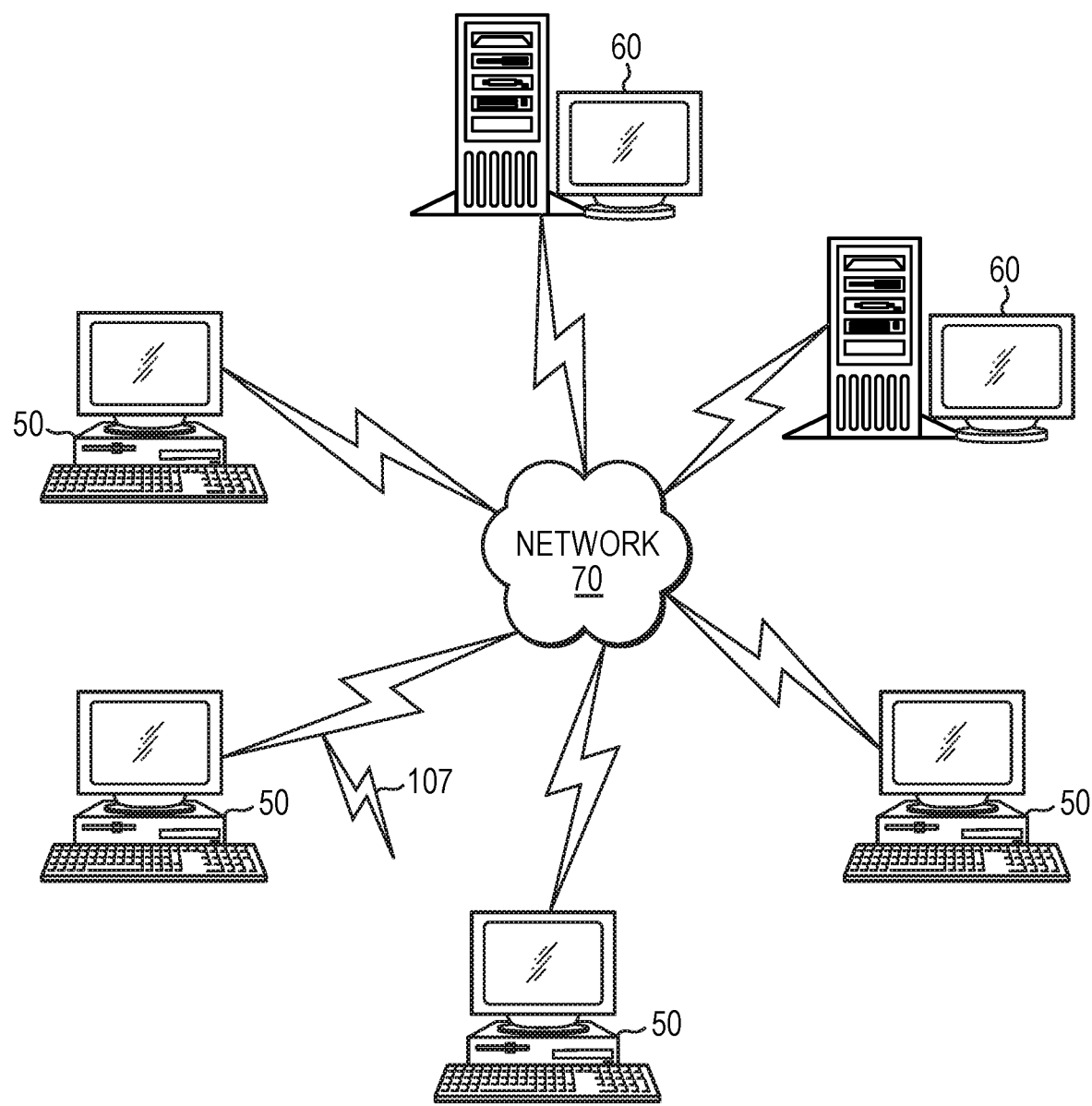
FIG. 7 is a schematic view of an example computer network in which embodiments of the present invention may be implemented.

FIG. 7 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

For example, server computers 60 may be configured as Application Server-1 402 (including a modeler engine that executes pattern model building process 100) and Application Server-2 403 (including analysis engine that executes online iteration process 200 and time series monitoring process 300) in the network architecture 400. Server computers 60 may also be configured as Data Server 411 for retrieving historical plant data from Database 412 in the network architecture 400 for building the pattern model. The server computers 60 may further be configured as an Instrumentation, Control, and Operation Computer 405 that is configured as part of the Distributed Control System (DCS) 404 in the network architecture 400. The Instrumentation, Control, and Operation Computer 405 may be communicatively coupled to client devices 50, including sensors 406-407 and other measurement control devices (valves, actuators, heaters, and the like 409A-I) for adjusting a plant process based on the built/deployed pattern model.

Figure 8:
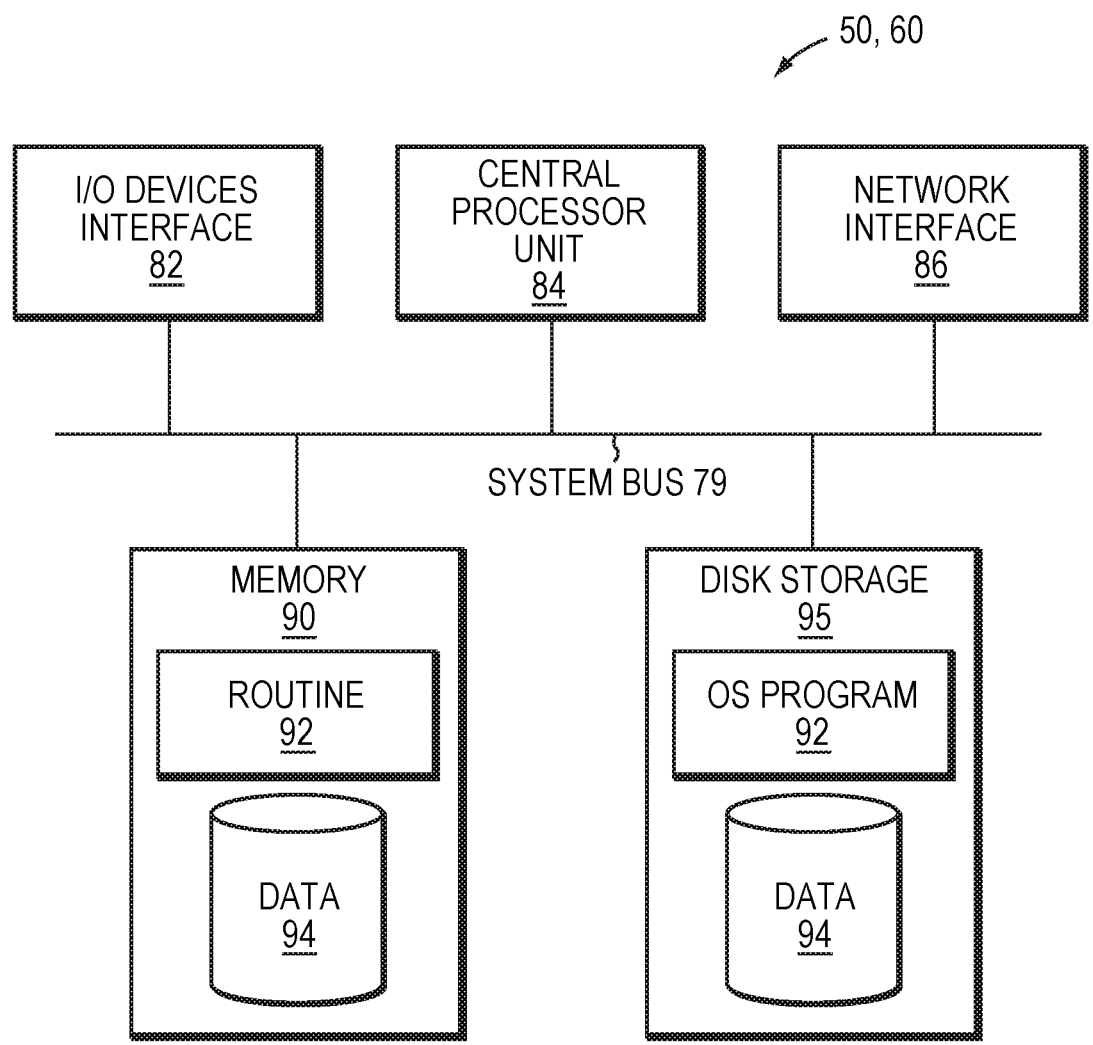
FIG. 8 is a block diagram of an example computer node in the computer network of FIG. 7.

FIG. 8 is a diagram of the internal structure of a computer (e.g., client processor/device 50 or server computers 60) in the computer system of FIG. 7. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 (such as User Interface 401 of the network architecture 400 of FIG. 4) for connecting various input and output devices (e.g., keyboard, mouse, displays, printers, speakers, etc.) to the computer 50, 60. Network interface 86 allows the computer to connect to various other devices attached to a network (e.g., network 70 of FIG. 7). Memory 90 provides volatile storage for computer software instructions 92 and data 94 used to implement an embodiment of the present invention (e.g., pattern model building process 100, online iteration process 200 of the pattern model, time series monitoring process 300, user interface implementation, and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 92 may be implemented as a so called Software as a Service (SaaS), or other installation or communication supporting end-users.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of detecting an operating event in an industrial process, the method comprising:
defining a signature of an operating event in an industrial process, the defined signature containing a time series pattern for a key performance indicator (KPI) associated with the operating event;
monitoring, during online execution of the industrial process, trends in movement of the KPI, wherein the trends in movement are monitored as a time series of the KPI;

determining, in real-time, a distance score between (i) a specified range of the monitored time series of the KPI and (ii) the time series pattern for the KPI contained in the defined signature, wherein determining the distance score in real-time for the KPI comprises: (a) performing Z-normalization on the monitored time series specified range and the time series pattern, (b) calculating an Euclidean distance with dynamic time warping (DTW) between the Z-normalized monitored time series specified range and the Z-normalized time series pattern, (c) calculating a zero-line Euclidean distance between a vector of zeros and the Z-normalized time series pattern, and (d) determining the distance score based on the calculated Euclidean distance with DTW and the calculated zero-line Euclidean distance, the distance score indicating the probability that the monitored time series specified range matches the time series pattern;

detecting the operating event associated with the defined signature in the executed industrial process based on the determined distance score; and in response to detecting the operating event, adjusting parameters of the industrial process to prevent the detected operating event.

2. The method of claim 1, wherein defining the signature further comprises:

loading historical plant data via data server from plant historian database;

identifying time series patterns of the KPI in the loaded historical plant data by at least one of: (i) automatic pattern search and identification techniques, (ii) application of operation logs, and (iii) review by a domain expert, the identified time series patterns being associated with the operating event;

selecting a time series range for the signature; and configuring the signature to contain an entire identified time series pattern that corresponds to the selected time series range.

3. The method of claim 2, wherein the automatic pattern search and identification techniques is a supervised pattern discovery technique comprising:

defining one or more pattern shapes representing pattern characteristics of an abnormal operating condition, the defined pattern shapes being stored in a shape library;

selecting a pattern shape from the shape library for the operating event, the selecting indicating inclusion or exclusion of the selected pattern shape when identifying time series patterns;

determining a distance profile between (i) the selected pattern shape and (ii) a time series of the KPI from the loaded historical plant data;

generating a search profile based on the determined distance profile; and using the generated search profile, determining one or more pattern clusters that contain the identified time series patterns associated with the operating event.

4. The method of claim 1, wherein determining the distance score in real-time for the KPI further comprises:

applying an amplitude filter to the Z-normalized monitored time series specified range.

5. The method of claim 1, further comprising:

applying filters to eliminate certain variations between the monitored time series specified range and the time series pattern when determining the distance score.

6. The method of claim 1, wherein the distance score is a value between 0 and 1, and wherein 1 indicates a highest probability of occurrence of the operating event and 0 indicates a lowest probability of occurrence of the operating event.

7. The method of claim 1, further comprising:

performing the defining, monitoring, determining, and detecting for multiple signatures of the KPI in parallel;

combining the distance score determined for each of the multiple defined signatures of the KPI into a combined distance score for the KPI; and detecting the operating event based on the combined distance score for the KPI.

8. The method of claim 7, wherein the time series patterns contained in the multiple defined signatures vary according to at least one of: amplitude, offset, shape, and time.

9. The method of claim 7, further comprising configuring a signature library for storing the multiple defined signatures.

10. The method of claim 1, further comprising:

performing the defining, monitoring, determining, and detecting for multiple KPIs in parallel;

defining a weight coefficient corresponding to each of the multiple KPIs;

weighting the distance score determined for a respective KPI based on the corresponding weight coefficient;

combining the weighted distance score for each of the multiple KPIs into a total distance score; and detecting the operating event based on the total distance score.

11. A computer system for detecting an operating event in an industrial process, the system comprising:

a processor; and a memory with computer code instructions stored thereon, the memory operatively coupled to the processor such that, when executed by the processor, the computer code instructions cause the computer system to implement:

a modeler engine configured to define a signature of an operating event in an industrial process, the defined signature containing a time series pattern for a key performance indicator (KPI) associated with the operating event;

an analysis engine configured to:

monitor, during online execution of the industrial process, trends in movement of the KPI, wherein the trends in movement are monitored as a time series of the KPI;

determine, in real-time, a distance score between (i) a specified range of the monitored time series of the KPI and (ii) the time series pattern for the KPI contained in the defined signature, wherein determining the distance score in real-time for the KPI comprises: (a) performing Z-normalization on the monitored time series specified range and the time series pattern, (b) calculating an Euclidean distance with dynamic time warping (DTW) between the Z-normalized monitored time series specified range and the Z-normalized time series pattern, (c) calculating a zero-line Euclidean distance between a vector of zeros and the Z-normalized time series pattern, and (d) determining the distance score based on the calculated Euclidean distance with DTW and the calculated zero-line Euclidean distance, the distance score indicating the probability that the monitored time series specified range matches the time series pattern; and detect the operating event associated with the defined signature in the executed industrial process based on the determined distance score; and a process control system configured to, in response to receiving information related to the detected operating event, adjust parameters of the industrial process to prevent the detected operating event.

12. The system of claim 11, wherein the modeler engine is further configured to:
load historical plant data from data server;
identify time series patterns of the KPI in the loaded historical plant data by at least one of: (i) automatic pattern search and identification techniques, (ii) application of operation logs, and (iii) review by a domain expert, the identified time series patterns being associated with the operating event;
select a time series range for the signature; and
configure the signature to contain an entire identified time series pattern that corresponds to the selected time series range.

13. The method of claim 12, wherein the automatic pattern search and identification techniques is a supervised pattern discovery technique comprising:
defining one or more pattern shapes representing pattern characteristics of an abnormal operating condition, the defined pattern shapes being stored in a shape library;
selecting a pattern shape from the shape library for the operating event, the selecting indicating inclusion or exclusion of the selected pattern shape when identifying time series patterns;
determining a distance profile between (i) the selected pattern shape and (ii) a time series of the KPI from the loaded historical plant data;
generating a search profile based on the determined distance profile; and
using the generated search profile, determining one or more pattern clusters that contain the identified time series patterns associated with the operating event.

14. The system of claim 11, wherein the analysis engine is configured to determine the distance score in real-time for the KPI by:
applying an amplitude filter to the Z-normalized monitored time series specified range.

15. The system of claim 11, wherein the analysis engine is further configured to:
apply filters to eliminate certain variations between the monitored time series specified range and the time series pattern when determining the distance score.

16. The system of claim 11, wherein the distance score is a value between 0 and 1, and wherein 1 indicates a highest probability of occurrence of the operating event and 0 indicates a lowest probability of occurrence of the operating event.

17. The system of claim 16, wherein the analysis engine is further configured to:
apply filters to eliminate certain variations between the monitored time series and the time series patterns when determining the distance score.

18. The system of claim 11, wherein the distance score is a value between zero to one, and wherein one indicates a highest probability of occurrence of the defined signature and zero indicates a lowest probability of occurrence of the defined signature.

19. The system of claim 11, wherein:
the modeler engine is further configured to:
perform the defining for multiple signatures of the operating event in parallel; and the analysis engine is further configured to:
perform the monitoring, determining, and detecting for multiple signatures of the KPI in parallel;
combine the distance score determined for each of the multiple defined signatures of the KPI into a combined distance score for the KPI; and
detect the operating event based on the combined distance score for the KPI.

20. The system of claim 19, wherein the time series patterns contained in the multiple defined signatures vary according to at least one of: amplitude, offset, shape, and time.

21. The system of claim 19, wherein the modeler engine is further configured to create a signature library for storing the multiple defined signatures.

22. The system of claim 11, wherein:
the modeler engine is further configured to:
perform the defining for multiple KPIs in parallel; and
the analysis engine is further configured to:
perform the monitoring, determining, and detecting for the multiple KPIs in parallel;
define a weight coefficient corresponding to each of the multiple KPIs;
weight the distance score determined for a respective KPI based on the corresponding weight coefficient;
combine the weighted distance score for each of the multiple KPIs into a total distance score; and
detect the operating event based on the total distance score.

23. A computer program product for detecting an operating event in an industrial process, the computer program product comprising:
a non-transitory computer-readable storage medium having code instructions stored thereon, the storage medium operatively coupled to a processor, such that, when executed by the processor, the code instructions cause the processor to:
define a signature of an operating event in an industrial process, the defined signature containing a time series pattern for a key performance indicator (KPI) associated with the operating event;
monitor, during online execution of the industrial process, trends in movement of the KPI, wherein the trends in movement are monitored as a time series of the KPI;
determine, in real-time, a distance score between (i) a specified range of the monitored time series of the KPI and (ii) the time series pattern for the KPI contained in the defined signature, wherein determining the distance score in real-time for the KPI comprises: (a) performing Z-normalization on the monitored time series specified range and the time series pattern, (b) calculating an Euclidean distance with dynamic time warping (DTW) between the Z-normalized monitored time series specified range and the Z-normalized time series pattern, (c) calculating a zero-line Euclidean distance between a vector of zeros and the Z-normalized time series pattern, and (d) determining the distance score based on the calculated Euclidean distance with DTW and the calculated zero-line Euclidean distance, the distance score indicating the probability that the monitored time series specified range matches the time series pattern;

detect the operating event associated with the defined signature in the executed industrial process based on the determined distance score; and in response to detecting the operating event, adjust parameters of the industrial process to prevent the detected operating event.

* * * * *